United States Patent
Yin et al.

(10) Patent No.: US 10,932,171 B2
(45) Date of Patent: Feb. 23, 2021

(54) ACCESS POINT SWITCHING METHOD AND APPARATUS

(71) Applicant: HUAWEI TECHNOLOGIES CO., LTD., Guangdong (CN)

(72) Inventors: Jiaxin Yin, Nanjing (CN); Sichen Wang, Shenzhen (CN); Yongjing Zhang, Nanjing (CN); Mitch Tseng, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 16/213,093

(22) Filed: Dec. 7, 2018

(65) Prior Publication Data

US 2019/0124573 A1 Apr. 25, 2019

Related U.S. Application Data

(63) Continuation of application No. PCT/CN2017/082162, filed on Apr. 27, 2017.

(30) Foreign Application Priority Data

Jun. 8, 2016 (CN) .................. 201610402671.X

(51) Int. Cl.
*H04W 36/00* (2009.01)
*H04W 36/08* (2009.01)
(Continued)

(52) U.S. Cl.
CPC ............ *H04W 36/08* (2013.01); *H04W 4/70* (2018.02); *H04W 36/00* (2013.01);
(Continued)

(58) Field of Classification Search
CPC ...... H04W 36/08; H04W 36/18; H04W 36/14; H04W 36/30
See application file for complete search history.

(56) References Cited

U.S. PATENT DOCUMENTS

2010/0111041 A1* 5/2010 Lim .................. H04W 36/02
370/331
2010/0272020 A1 10/2010 Norp et al.
(Continued)

FOREIGN PATENT DOCUMENTS

CN 104581796 A 4/2015
CN 104904164 A 9/2015
(Continued)

OTHER PUBLICATIONS

Akihiro et al., "The Standardization Trend of one M2M," The Frontiers of Global Standard NTT GIJUTU Journal, vol. 26, No. 6, pp. 38-41, The Telecommunications Association, Jun. 1, 2014, 12 pages.
(Continued)

*Primary Examiner* — Shantell L Heiber
(74) *Attorney, Agent, or Firm* — Fish & Richardson P.C.

(57) ABSTRACT

The present application relates to the field of information technologies, and discloses an access point switching method and apparatus, to avoid interruption of another communication service that needs to be performed with an AE by using an M2M platform, thereby improving user experience. According to the present invention, after an access point for the AE is switched from the M2M platform to the M2M gateway, the AE can receive communication services corresponding to the M2M platform and the M2M gateway.

16 Claims, 10 Drawing Sheets

(51) Int. Cl.
*H04W 4/70* (2018.01)
*H04W 48/20* (2009.01)
*H04W 88/16* (2009.01)

(52) U.S. Cl.
CPC ........ *H04W 36/0011* (2013.01); *H04W 48/20* (2013.01); *H04W 88/16* (2013.01)

(56) References Cited

U.S. PATENT DOCUMENTS

| | | | |
|---|---|---|---|
| 2011/0280215 A1* | 11/2011 | Nakagawa | H04W 36/14 370/331 |
| 2012/0084568 A1 | 4/2012 | Sarikaya et al. | |
| 2013/0183970 A1* | 7/2013 | Chen | H04W 36/0061 455/436 |
| 2013/0346504 A1* | 12/2013 | Huang | H04L 12/185 709/204 |
| 2014/0215043 A1 | 7/2014 | Ryu et al. | |
| 2015/0031335 A1 | 1/2015 | Dong et al. | |
| 2015/0282026 A1* | 10/2015 | Gupta | H04W 48/16 370/331 |
| 2015/0358874 A1 | 12/2015 | Ahn et al. | |
| 2016/0007137 A1 | 1/2016 | Ahn et al. | |
| 2016/0019294 A1 | 1/2016 | Dong et al. | |
| 2016/0112981 A1 | 4/2016 | Ahn et al. | |
| 2016/0241635 A1 | 8/2016 | Yu et al. | |
| 2016/0269490 A1 | 9/2016 | Wu | |
| 2016/0302069 A1 | 10/2016 | Kim et al. | |
| 2017/0238122 A1 | 8/2017 | Yang | |
| 2017/0238193 A1 | 8/2017 | Futaki | |
| 2017/0257726 A1 | 9/2017 | Jeong et al. | |
| 2017/0295452 A1 | 10/2017 | Wu | |
| 2017/0311114 A1 | 10/2017 | Yang | |
| 2017/0332426 A1 | 11/2017 | Wu | |
| 2019/0260822 A1 | 8/2019 | Jiaxin Yin et al. | |

FOREIGN PATENT DOCUMENTS

| | | |
|---|---|---|
| CN | 104995889 A | 10/2015 |
| CN | 105281941 A | 1/2016 |
| CN | 105338615 A | 2/2016 |
| CN | 105409304 A | 3/2016 |
| CN | 105491620 A | 4/2016 |
| CN | 105531980 A | 4/2016 |
| CN | 105592400 A | 5/2016 |
| KR | 20150014348 A | 2/2015 |
| WO | 2015062052 A1 | 5/2015 |
| WO | 2015080515 A1 | 6/2015 |
| WO | 2015114695 A1 | 8/2015 |
| WO | 2016003071 A1 | 1/2016 |
| WO | 2016026098 A1 | 2/2016 |
| WO | 2016041342 A1 | 3/2016 |
| WO | 2016062119 A1 | 4/2016 |
| WO | 2016070565 A1 | 5/2016 |
| WO | 2016074472 A1 | 5/2016 |

OTHER PUBLICATIONS

Office Action issued in Japanese Application No. 2018-564319 dated Oct. 29, 2019, 6 pages (with English translation).
Vidanagama, "A Study on Gateway Selection in an M2M Architecture," Proceedings of the 2014 Institute of Electronics, Information and Communication Engineers (IEICE) Society Conference, vol. 2, Section 96-97, Sep. 26, 2014, 2 pages.
Office Action issued in Chinese Application No. 201610402671.X dated Dec. 9, 2019, 11 pages (With English Translation).
Office Action issued in Chinese Application No. 201610402671.X dated Jun. 19, 2019, 13 pages (With English Translation).
International Search Report and Written Opinion issued in International Application No. PCT/CN2017/082162 dated Aug. 9, 2017, 17 pages.
Extended European Search Report issued in European Application No. 17809582.4 dated Feb. 11, 2019, 18 pages.

* cited by examiner

US 10,932,171 B2

ACCESS POINT SWITCHING METHOD AND APPARATUS

CROSS-REFERENCE TO RELATED APPLICATIONS

This application is a continuation of International Application No. PCT/CN2017/082162, filed on Apr. 27, 2017, which claims priority to Chinese Patent Application No. 201610402671.X, filed on Jun. 8, 2016, The disclosures of the aforementioned applications are hereby incorporated by reference in their entireties.

TECHNICAL FIELD

The present application relates to the field of information technologies, and in particular, to an access point switching method and apparatus.

BACKGROUND

Machine-to-machine communication (M2M Communication) is a networked application and service in which intelligent machine interaction is used as a core. Data may be transmitted from one terminal to another terminal in an M2M technology, so that machine-to-machine communication is implemented. An M2M system includes an M2M platform 102, an M2M gateway 103, an M2M device 104, and an AE (Application Entity, application entity) 101. As shown in FIG. 1A, the M2M platform 102 may be an IN (Infrastructure Node, infrastructure node), the M2M gateway 103 is an MN (Middle Node), and the M2M device may be an ASN (Application Service Node) or an ADN (Application Dedicated Node), which is not shown in FIG. 1A. In addition, a CSE (Common Service Entity) is used as a common capability component of the M2M system, and can bear a common capability. The CSE may be included in the M2M platform, the M2M gateway, or the ASN used as the M2M device, so as to implement a corresponding function. The AE may exist independently, or may be included in the M2M platform, the M2M gateway, or the ASN or ADN used as the M2M device. The CSE allows, by using an Mca reference point, the AE to access a common capability opened by the CSE, implements communication between CSEs by using an Mcc reference point, and invokes an underlying network capability by using an Mcn reference point. All of the M2M platform, the M2M gateway, and the M2M device may store various resources. The application entity AE accesses, by using the CSE of the M2M platform, the CSE of the M2M gateway, or the CSE of the M2M device, the various resources stored on the M2M platform, the M2M gateway, and the M2M device.

If an AE wants to access a resource on the M2M platform or the M2M gateway, the AE needs to register with the CSE of the M2M platform or the CSE of the M2M gateway. However, an existing AE can register with only one CSE of an entity in a same time period, for example, can register with only a CSE of a M2M platform or only a CSE of a M2M gateway. Then, the AE accesses, by using the registrar CSE (Registrar CSE, R-CSE for short), a resource stored on a CSE. The CSE on which the accessed resource is located is an H-CSE (Hosting CSE, hosting CSE). Usually, the R-CSE is used as an access point for communication between the AE and another entity in the M2M system.

For example, the CSE on the M2M platform is used as an R-CSE for an AE. If the AE needs to access a resource stored on the M2M gateway, the CSE on the M2M gateway is used as an H-CSE. Therefore, the AE needs to use the R-CSE to access the resource stored on the M2M gateway on which the H-CSE is located. However, because the AE needs to use the CSE of the M2M platform to access the resource on the M2M gateway, a resource request chain is excessively long, resulting in relatively large network resource overheads. Therefore, another method is that the AE deregisters from the CSE of the M2M platform, and then registers with the CSE of the M2M gateway. In other words, to directly access the resource stored on the M2M gateway, the AE needs to switch an access point for the AE from the M2M platform to the M2M gateway.

In an access point switching method provided in the prior art, when a device is in a local area network in which an M2M gateway is located, an AE on the M2M device sends a deregistration request message to an R-CSE (such as a CSE of an M2M platform) for the AE. The deregistration request message is used by the AE to request the R-CSE to delete a resource created by the AE on the M2M platform. After receiving the deregistration request message, the M2M platform deletes the resource created by the AE on the M2M platform, and returns a success response message to the AE. Then, the AE sends a registration request message to the M2M gateway, and the registration request message is used to request to create, on the M2M gateway, a resource corresponding to the AE, so as to complete registration of the AE on the M2M gateway.

However, in the process in which the AE deregisters from the M2M platform and then registers with the M2M gateway, because the M2M platform deletes the registration resource stored by the AE on the M2M platform, and the registration resource includes address information of the AE, the M2M platform cannot communicate with the AE, resulting in interruption of another communication task of communicating with the AE by using the M2M platform. Therefore, user experience is relatively poor.

SUMMARY

The present embodiment provides an access point switching method and apparatus and a related device, to avoid interruption of another communication service that needs to be performed with an AE by using an M2M platform, thereby improving user experience.

In specific implementation, an M2M system includes an M2M platform, an AE, and an M2M platform. The M2M platform is an access point for the AE before the AE performs access point switching. The M2M gateway is an access point for the AE after the AE performs access point switching. The M2M platform is an access point for the M2M gateway. The AE sends an access point switching request to the M2M platform, so that the M2M platform requests the M2M gateway to create a connection resource of the AE. When the M2M gateway successfully creates the connection resource of the AE, the M2M platform records a connection address of the M2M gateway in a registration resource of the AE, and sends an access point switching response message to the AE, so as to implement access point switching. In the present embodiment, the access point switching is applied to the M2M system, to avoid interruption of another communication service that needs to be performed with the AE by using the M2M platform, thereby improving user experience.

According to a first aspect, the present embodiment provides an access point switching method, where the method is applied to a machine-to-machine communication M2M system. The M2M system includes an M2M platform, an application entity AE, and an M2M gateway. The M2M platform is an access point for the AE before the AE performs access point switching. The M2M gateway is an access point for the AE after the AE performs access point switching. The M2M platform is an access point for the M2M gateway. Specifically, the M2M platform receives an access point switching request message sent by the AE, where the access point switching request message carries a common services entity CSE identifier of the M2M gateway; and then sends a resource creation request message to the M2M gateway, where the resource creation request message is used to request the M2M gateway to create a connection resource of the AE, and the resource creation request message carries an identifier of the AE. Subsequently, the M2M platform receives a response message indicating that resource creation succeeds that is sent by the M2M gateway, where the response message indicating that resource creation succeeds carries access information allocated by the M2M gateway to the AE; and then sends an access point switching response message to the AE, where the access point switching response message carries the access information allocated by the M2M gateway to the AE. In embodiments of the present embodiment, the M2M platform requests the M2M gateway to create the connection resource of the AE, so that when receiving a service request that does not belong to the M2M gateway, the M2M gateway sends the service request to the M2M platform based on the created connection resource of the AE, so as to avoid interruption of another communication service that needs to be performed with the AE by using the M2M platform, thereby improving user experience.

In a possible design, after the M2M platform receives the access point switching request message sent by the AE, the M2M platform replaces information included in access point information of the AE with the CSE identifier of the M2M gateway, and records, in the access point information of the AE, the access information allocated by the M2M gateway to the AE; or the M2M platform adds a piece of access point information at a specific location in an access point information list of the AE, and records, in the access point information added at the specific location, the access information allocated by the M2M gateway to the AE. Therefore, the M2M platform can determine the M2M gateway accessed by the AE, and then may send a subscribed service or subscribed resource by using the M2M gateway accessed by the AE.

In another possible design, the M2M platform may further receive a request message sent by the AE for querying the CSE identifier that is of the M2M gateway corresponding to a local area network identifier, where the request message for querying the CSE identifier that is of the M2M gateway corresponding to the local area network identifier carries the local area network identifier. Then, the M2M platform obtains, based on the local area network identifier, the CSE identifier that is of the M2M gateway corresponding to the local area network identifier. Subsequently, the M2M platform sends, to the AE, a success message carrying the CSE identifier of the M2M gateway. Finally, the M2M platform records, in access point information including the CSE identifier of the M2M gateway, the local area network identifier of a network to which the M2M gateway belongs. Therefore, the AE can determine, based on the local area network identifier of the local area network, the M2M gateway that the AE needs to access.

In a possible design, before the M2M platform receives the access point switching request message sent by the AE, the M2M platform receives an obtaining request sent by the AE for an M2M gateway adjacent to the AE, where the obtaining request for the M2M gateway adjacent to the AE carries location information of the AE and information about an area covered by a local area network corresponding to a local area network type supported by the AE. Then, the M2M platform returns, to the AE based on the location information of the AE and the information about the area covered by the local area network corresponding to the local area network type supported by the AE, a CSE identifier of the M2M gateway adjacent to the AE. Subsequently, the M2M platform receives a request sent by the AE for querying a CSE identifier of an M2M gateway that belongs to a local area network whose type is the same as the local area network type supported by the AE, where the request for querying the CSE identifier of the M2M gateway that belongs to the local area network whose type is the same as the local area network type supported by the AE carries the CSE identifier of the M2M gateway adjacent to the AE and the local area network type supported by the AE. Subsequently, the M2M platform returns the CSE identifier of the M2M gateway that is adjacent to the AE and that belongs to the local area network whose type is the same as the local area network type supported by the AE. Finally, the M2M platform records, in the access point information including the CSE identifier of the M2M gateway, the type of the local area network to which the M2M gateway belongs. Therefore, the AE can obtain, based on the location information of the AE and the information about the area covered by the local area network corresponding to the local area network type supported by the AE, the CSE identifier of the M2M gateway that the AE needs to access, so that the AE can access the M2M gateway.

In a possible design, after the M2M platform sends the access point switching response message to the AE, the M2M platform receives an access point update request message sent by the AE, where the access point update request message carries the identifier of the AE. The access point update request message carries an IP address and port number information that are of the AE, and then the M2M platform replaces, based on the access point update request message, the access point information including the CSE identifier of the M2M gateway with access point information including the IP address and the port number information. Alternatively, the access point update request message carries a CSE identifier recorded in the access point information list and information instructing to delete the CSE identifier recorded at a specific location, and the M2M platform deletes, based on the CSE identifier in the access point update request message, access point information that is in the access point information list and that includes the CSE identifier in the access point update request message. Therefore, after the AE leaves a coverage area of the previously accessed M2M gateway, the M2M platform can enable the AE to access another access point corresponding to the AE, so that the AE can access a resource stored in the another access point.

In a possible design, after the M2M platform receives the access point update request message sent by the AE, the M2M platform may further send a resource deletion request message to an M2M gateway corresponding to the CSE identifier of the M2M gateway that is in the deleted or replaced access point information, where the resource deletion request message carries an identifier of the connection resource of the AE. Then, the M2M platform receives a success response message sent by the M2M gateway corresponding to the CSE identifier of the M2M gateway that is in the deleted or replaced access point information, where the success response message is used to represent that the connection resource of the AE is deleted. Finally, the M2M platform sends the success response message to the AE. The connection resource corresponding to the AE that accesses previously is deleted by using the M2M gateway, so as to avoid the connection resource corresponding to the AE that has left a coverage area of the M2M gateway from occupying storage space of the M2M gateway, thereby saving the storage space of the M2M gateway.

In a possible design, the M2M platform may further receive a notification message sent by another device to the AE, where the notification message carries the identifier of the AE. Then, the M2M platform determines, based on the identifier of the AE, that the access point information of the AE that is included in a registration resource of the AE is the CSE identifier of the M2M gateway. Finally, the M2M platform forwards the notification message to the M2M gateway. Therefore, after the AE completes access point switching, in a period in which a current access point is the M2M gateway corresponding to the CSE identifier, a device in which a resource subscribed by the AE is located sends a notification message to the AE after the resource subscribed by the AE changes, so as to inform the AE of a latest status of the resource after the change.

According to a second aspect, an embodiment of the present embodiment provides a computer storage medium. The computer storage medium is configured to store a computer software instruction used by the foregoing M2M platform, and includes a program designed for executing the foregoing aspect.

According to a third aspect, an embodiment of the present embodiment provides an M2M platform. The M2M platform has a function of implementing actual behavior of the M2M platform in the foregoing method. The function may be implemented by hardware, or may be implemented by hardware by executing corresponding software. The hardware or the software includes one or more units corresponding to the foregoing function.

According to a fourth aspect, a structure of an M2M platform includes a memory, a transceiver, and a processor. The memory is configured to store computer executable program code, and is coupled to the transceiver. The program code includes an instruction, and when the processor executes the instruction, the instruction enables the apparatus to execute information or an instruction related to the foregoing method.

According to a fifth aspect, the present embodiment provides an access point switching method, where the method is applied to an M2M system. The M2M system includes an M2M platform, an application entity AE, and an M2M gateway. The M2M platform is an access point for the AE before the AE performs access point change. The M2M gateway is an access point for the AE after the AE performs access point change. The M2M platform is an access point for the M2M gateway. Specifically, the AE sends an access point switching request message to the M2M platform, where the access point switching request message carries a CSE identifier of the M2M gateway; then receives an access point switching response message sent by the M2M platform, where the access point switching response message carries access information allocated by the M2M gateway to the AE; and finally, sends a resource access request to the M2M gateway based on the access information allocated by the M2M gateway to the AE. In embodiments of the present embodiment, the AE can directly perform access by using the M2M gateway without changing a registration point, so as to avoid interruption of another communication service that needs to be performed with the AE by using the M2M platform, thereby improving user experience.

In a possible design, the access information of the AE further includes a local area network identifier of a network to which the M2M gateway belongs. Before the AE sends the access point switching request message to the M2M platform, the AE accesses the local area network to which the M2M gateway belongs, and determines the local area network identifier of the local area network. Then, the AE sends, to the M2M platform, a request message for querying the common services entity CSE identifier that is of the M2M gateway corresponding to the local area network identifier, where the request message for querying the CSE identifier that is of the M2M gateway corresponding to the local area network identifier carries the local area network identifier. Finally, the AE receives a success message that is sent by the M2M platform and that carries the CSE identifier of the M2M gateway. Therefore, the AE may obtain, based on the local area network identifier of the local area network to which the M2M gateway belongs, the CSE identifier of the M2M gateway that the AE needs to access.

In a possible design, before the AE sends the access point switching request message to the M2M platform, the AE sends, to the M2M platform, an obtaining request for an M2M gateway adjacent to the AE, where the obtaining request for the M2M gateway adjacent to the AE carries location information of the AE and information about an area covered by a local area network corresponding to a local area network type supported by the AE. Then, the AE receives a common services entity CSE identifier of the M2M gateway adjacent to the AE that is returned by the M2M platform. Subsequently, the AE sends, to the M2M platform, a request for querying a CSE identifier of an M2M gateway that belongs to a local area network whose type is the same as the local area network type supported by the AE, where the request for querying the CSE identifier of the M2M gateway that belongs to the local area network whose type is the same as the local area network type supported by the AE carries the CSE identifier of the M2M gateway adjacent to the AE and the local area network type supported by the AE. Finally, the AE receives the CSE identifier, returned by the M2M platform, of the M2M gateway that is adjacent to the AE and that belongs to the local area network whose type is the same as the local area network type supported by the AE. Therefore, when the AE obtains only the network type of the local area network to which the M2M gateway belongs, the AE can still obtain the CSE identifier of the M2M gateway corresponding to the AE that is sent by the M2M platform, so that the AE can access the M2M gateway based on the CSE identifier of the M2M gateway.

According to a sixth aspect, an embodiment of the present embodiment provides a computer storage medium. The computer storage medium is configured to store a computer software instruction used by the foregoing AE, and includes a program designed for executing the foregoing aspect.

According to a seventh aspect, an embodiment of the present embodiment provides an AE. The AE has a function of implementing actual behavior of the AE in the foregoing method. The function may be implemented by hardware, or may be implemented by hardware by executing corresponding software. The hardware or the software includes one or more units corresponding to the foregoing function.

According to an eighth aspect, a structure of an apparatus of an AE includes a memory, a transceiver, and a processor. The memory is configured to store computer executable program code, and is coupled to the transceiver. The program code includes an instruction, and when the processor executes the instruction, the instruction enables the apparatus to execute information or an instruction related to the foregoing method.

According to a ninth aspect, the present embodiment provides an access point switching method, where the method is applied to an M2M system. The M2M system includes an M2M platform, an application entity AE, and an M2M gateway. The M2M platform is an access point for the AE before the AE performs access point switching. The M2M gateway is an access point for the AE after the AE performs access point change. The M2M platform is an access point for the M2M gateway. Specifically, the M2M gateway receives a resource creation request message sent by the M2M platform, where the resource creation request message is used to request the M2M gateway to create a connection resource of the AE, and the resource creation request message carries an identifier of the AE; and then creates the connection resource of the AE based on the resource creation request message, where the connection resource of the AE includes access information of the AE. Subsequently, the M2M gateway sends, to the M2M platform, a response message indicating that resource creation succeeds, where the response message indicating that resource creation succeeds carries the access information allocated by the M2M gateway to the AE. Then, the M2M gateway receives a resource access request message sent by the AE based on the access information allocated by the M2M gateway to the AE. Finally, the M2M gateway processes the resource access request message. Therefore, when the M2M gateway receives a service request and the service request is not a service request for a service of the M2M gateway, the M2M gateway can send the service request to the M2M platform based on the created connection resource of the AE, so as to avoid service interruption, thereby improving user experience.

In a possible design, after the M2M gateway creates the connection resource of the AE based on the resource creation request message, the M2M gateway allocates a connection address of the AE in a local area network based on a local area network identifier of the network to which the M2M gateway belongs. Therefore, the AE can obtain the connection address in the local area network, and then the AE can access, based on the connection address in the local area network, the M2M gateway corresponding to the connection address in the local area network.

In a possible design, the access information of the AE further includes a local area network identifier of a network to which the M2M gateway belongs. After the M2M gateway creates the connection resource of the AE based on the resource creation request message, the M2M gateway may further allocate a connection key of the AE in the local area network based on the local area network identifier of the network to which the M2M gateway belongs. Therefore, security of accessing the M2M gateway by the AE can be improved.

In a possible design, the access information of the AE includes a network type of a local area network to which the M2M gateway belongs. The M2M gateway may further obtain location information of the AE, and allocate a connection address of the AE in the local area network based on the network type of the local area network of the network to which the M2M gateway belongs and the location information of the AE. Therefore, the M2M gateway can allocate the connection address of the AE in the local area network based on the network type of the local area network to which the M2M gateway belongs, so that the AE accesses, based on the connection address in the local area network to which the M2M gateway belongs, the M2M gateway corresponding to the connection address.

In a possible design, the access information of the AE includes a network type of a local area network to which the M2M gateway belongs. The M2M gateway may further obtain location information of the AE, and allocate a connection key of the AE in the local area network based on the network type of the local area network of the network to which the M2M gateway belongs and the location information of the AE. Therefore, the M2M gateway can allocate the connection key of the AE in the local area network based on the location information of the AE and the network type of the local area network of the network to which the M2M gateway belongs, thereby improving security of accessing the local area network by the AE.

According to a tenth aspect, an embodiment of the present embodiment provides a computer storage medium. The computer storage medium is configured to store a computer software instruction used by the foregoing M2M gateway, and includes a program designed for executing the foregoing aspect.

According to an eleventh aspect, an embodiment of the present embodiment provides an M2M gateway. The M2M gateway has a function of implementing actual behavior of the M2M gateway in the foregoing method. The function may be implemented by hardware, or may be implemented by hardware by executing corresponding software. The hardware or the software includes one or more units corresponding to the foregoing function.

According to a twelfth aspect, a structure of an apparatus of an M2M gateway includes a memory, a transceiver, and a processor. The memory is configured to store computer executable program code, and is coupled to the transceiver. The program code includes an instruction, and when the processor executes the instruction, the instruction enables the apparatus to execute information or an instruction related to the foregoing method.

It can be learned from the foregoing solutions that, when the AE needs to switch the access point from the M2M platform to the M2M gateway, the AE sends the access point switching request to the M2M platform, so that the M2M platform requests the M2M gateway to create the connection resource of the AE. After the M2M gateway successfully creates the connection resource of the AE, the M2M platform records a connection address of the M2M gateway in the registration resource of the AE, and sends the access point switching response message to the AE, so that the access point is switched from the M2M platform to the M2M gateway. This can avoid interruption of another communication service that needs to be performed with the AE by using the M2M platform, thereby improving user experience.

BRIEF DESCRIPTION OF DRAWINGS

To describe the technical solutions in the present embodiment, the following describes the accompanying drawings required for describing the present embodiment.

DESCRIPTION OF EMBODIMENTS

The following describes the technical solutions in the embodiments of the present embodiment with reference to the accompanying drawings in the embodiments of the present embodiment. Apparently, the described embodiments are merely some but not all of the embodiments of the present embodiment. All other embodiments obtained by persons of ordinary skill in the art based on the embodiments of the present embodiment without creative efforts shall fall within the protection scope of the present embodiment.

Figure 1A:
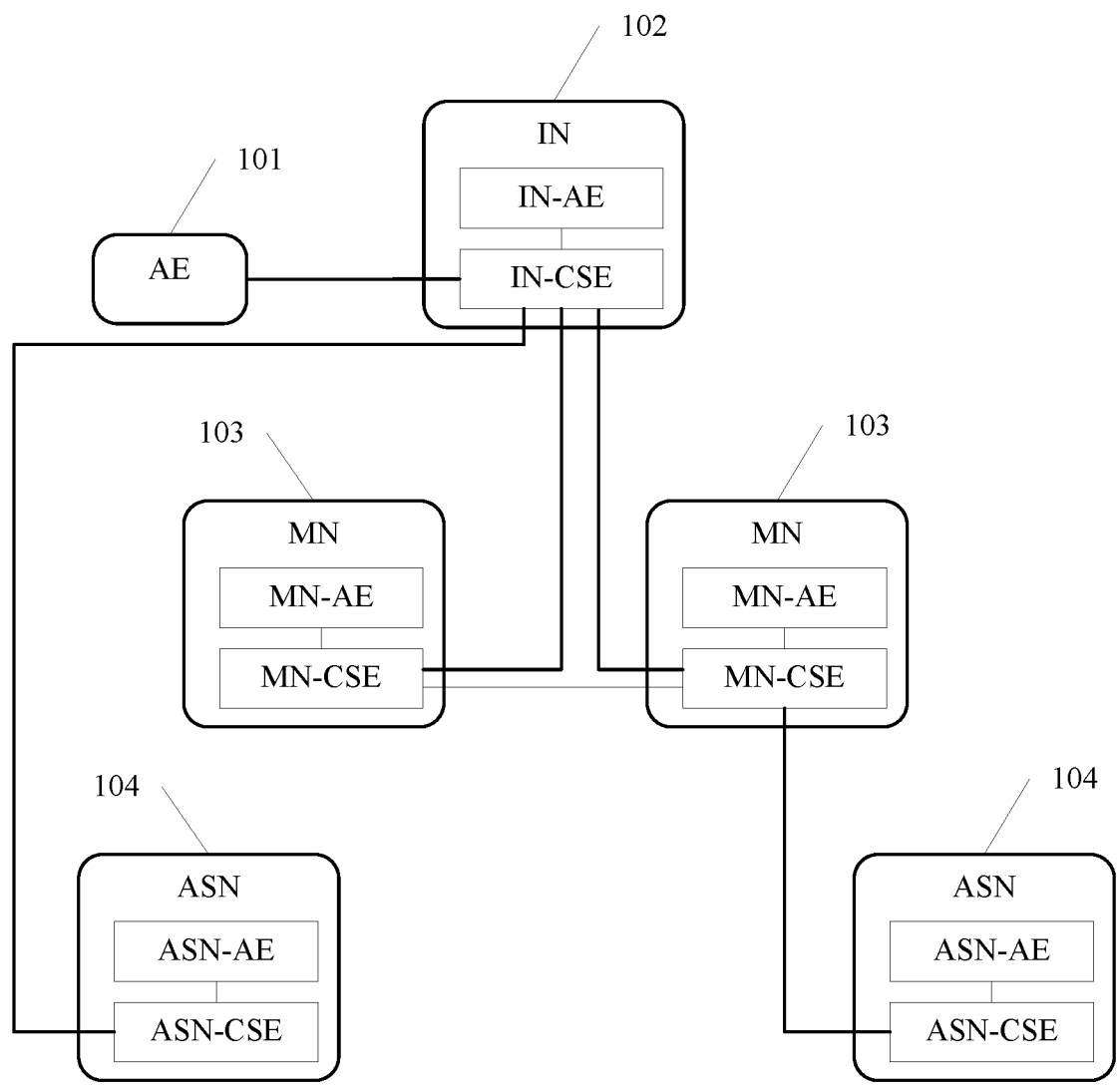
FIG. 1A is a schematic diagram of an M2M system architecture according to an embodiment of the present embodiment.
Figure 1B:
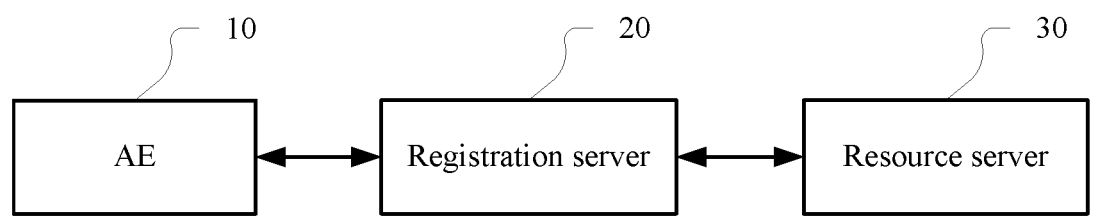
FIG. 1B is a schematic structural diagram of an M2M system in which an AE performs connection switching according to an embodiment of the present embodiment.

In the embodiments of the present embodiment, FIG. 1B is a schematic structural diagram of a system according to an embodiment of the present embodiment. The system includes an AE 10, a registration server 20, and a resource server 30, and the registration server 20 is a server with which the AE registers. The registration server includes a common server CSE in an M2M system architecture. In this embodiment, the CSE of the registration server is referred to as an R-CSE (Registrar Common Service Entity), namely a CSE with which the AE registers. The resource server 30 is a server that stores a resource to be accessed by the AE. The resource server includes a common server CSE in the M2M system architecture. In this embodiment, the CSE of the resource server is referred to as an H-CSE (Hosting Common Service Entity), namely a resource hosting entity or an attribute hosting entity. It should be noted that the AE 10 in this embodiment of the present embodiment may be an entity included in an ADN, an ASN, an MN, and an IN in an architecture shown in FIG. 1A, and the registration server 20 may be an ASN, an MN, or an IN in the architecture shown in FIG. 1A. The resource server may be an ASN, an MN, or an IN in the architecture shown in FIG. 1A. In this embodiment of the present embodiment, one AE 10 can register with at most one registration server 20. The registration server 20 may be an operator platform, or may be a home gateway. In this embodiment of the present embodiment, it is assumed that the registration server for the AE is an IN (namely an M2M platform). In this case, the R-CSE is a CSE of the M2M platform. The resource server 30 provides a specific service, and may be a weather server, or may be a fleet management server. The AE 10 may obtain a resource or an attribute of a resource from the resource server 30 by using the registration server 20. In this embodiment of the present embodiment, it is assumed that the resource server is an MN, and an H-CSE in the following description is a CSE of an M2M gateway.

Figure 2:
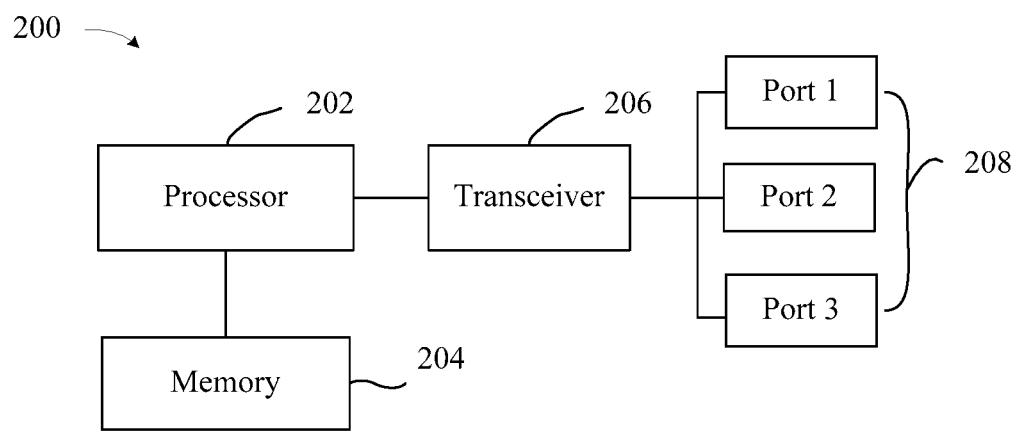
FIG. 2 is a schematic diagram of a logical structure of an access point switching apparatus according to an embodiment of the present embodiment.

FIG. 2 is a schematic structural diagram of an access point switching apparatus according to an embodiment of the present embodiment. The access point switching apparatus is configured to: receive an access point switching request message, and trigger an access point switching procedure in the M2M system shown in FIG. 1B. The apparatus 200 may include one or more ports 208, which are coupled to a transceiver (transceiver) 206. The transceiver 206 may be a transmitter, a receiver, or a combination thereof, and the transceiver is configured to interact with another entity. A processor 202 is coupled to the transceiver 206, and is configured to process a data packet. The processor 202 may include one or more multi-core processors and/or a memory 204. The processor 202 may be a general-purpose processor, an application-specific integrated circuit (application-specific integrated circuit, ASIC), or a digital signal processor (DSP).

The memory 204 may be a non-transitory storage medium, is coupled to the processor 202, and is configured to store different types of data, such as a semantic description resource and a resource described by using a semantic description resource. The memory 204 may include a read-only memory (read-only memory, ROM), a random access memory (random access memory, RAM), or another type of dynamic storage device that can store information and an instruction, or may be a disk memory. The memory 204 may be configured to store an instruction for implementing a method related to semantic verification. It may be understood that an executable instruction is programmed or loaded into at least one of the processor 202, a cache, and a long term memory of the apparatus 200.

In an example, the apparatus 200 is used as a registration server (such as an M2M platform) for an AE, and includes the memory 204, the processor 202, and the transceiver 206. The memory 204 is configured to: store computer executable program code, and a registration resource and a connection resource of the AE, and store a registration resource of a CSE (namely an H-CSE) used as a resource server. The processor 202 is coupled to the memory 204 and the transceiver 206.

The program code includes an instruction. When the processor executes the instruction, the instruction enables the network element to perform related steps performed by an M2M platform in FIG. 4A and FIG. 4B, FIG. 5, and FIG. 6.

In another example, the apparatus shown in FIG. 2 may be an M2M gateway, and may execute one or more instructions according to this embodiment of the present embodiment, so as to perform access point switching. The instructions may be stored in the memory 204. When the processor executes the instructions, the instructions enable the apparatus to perform related steps performed by an M2M gateway in FIG. 4A and FIG. 4B, FIG. 5, and FIG. 6.

In another example, the apparatus 200 is used as an M2M device, and includes the memory 204, the processor 202, and the transceiver 206. The memory 204 is configured to store computer executable program code, and the processor 202 is coupled to the memory 204 and the transceiver 206.

The program code includes an instruction. When the processor executes the instruction, the instruction enables the network element to perform related steps performed by an AE in FIG. 4A and FIG. 4B, FIG. 5, and FIG. 6.

In addition, FIG. 2 may further be a schematic diagram of another access point switching apparatus (such as a resource server to be accessed by an AE) according to an embodiment of the present embodiment. As the resource server (namely a server on which an H-CSE is located in this embodiment of the present embodiment) to be accessed by the AE, the device in FIG. 2 includes a memory 204, a processor 202, and a transceiver 206. The memory 204 is configured to store a resource to be accessed by the AE and computer executable program code, and the processor 202 is coupled to the memory 204 and the transceiver 206.

The program code includes an instruction. When the processor executes the instruction, the instruction enables the network element to perform related steps performed by a resource server (such as an M2M gateway) to be accessed by an AE in FIG. 4A and FIG. 4B, FIG. 5, and FIG. 6.

Figure 3A:
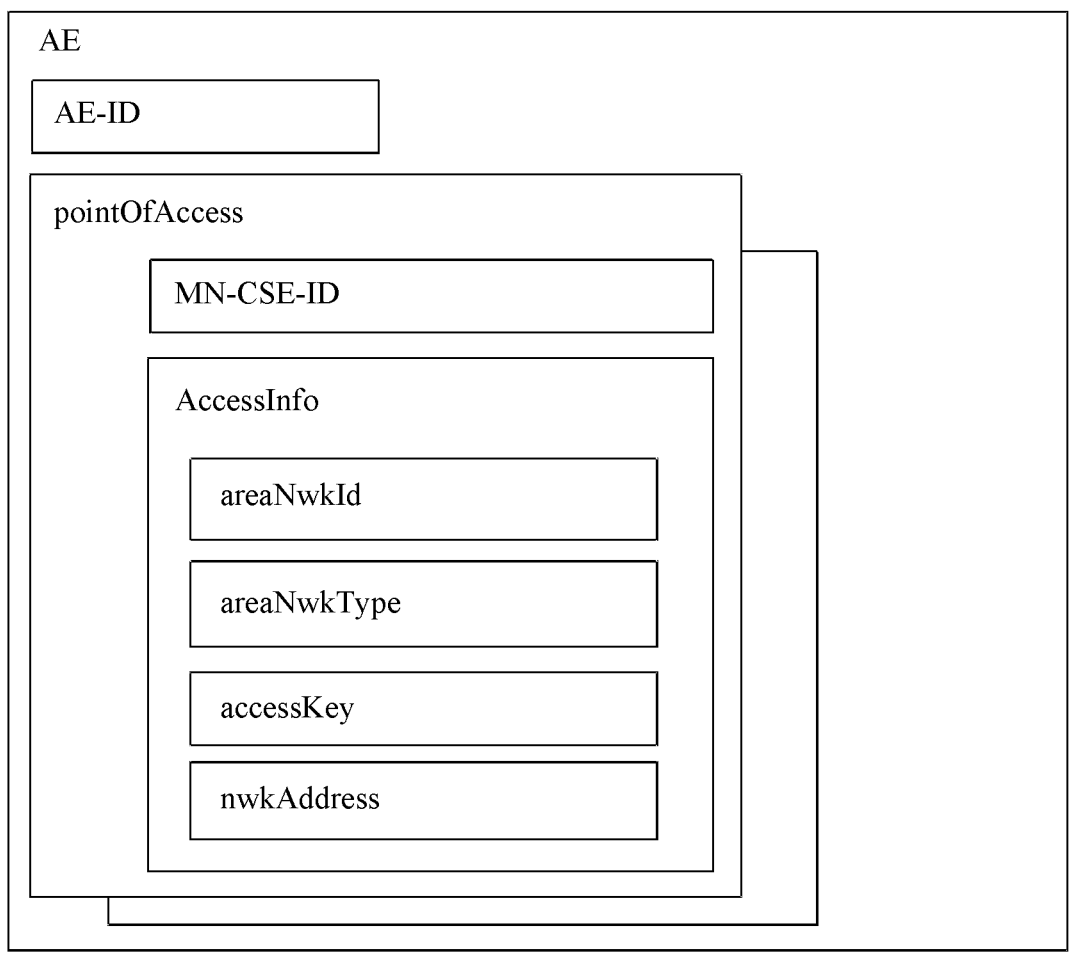
FIG. 3A is a schematic structural diagram of a registration resource of an AE that is stored on an M2M platform according to an embodiment of the present embodiment.

FIG. 3A is a schematic diagram of a registration resource of an AE that is stored on an M2M platform. Specifically, the registration resource of the AE is a resource that is created by the AE on the M2M platform and that is recorded on the M2M platform (specifically, the registration resource may be a resource recorded by a CSE of the M2M platform in the CSE of the M2M platform). The registration resource of the AE includes an identifier (AE-ID) and access point information (pointOfAccess) of the AE. Specific content of an AE-ID attribute is the AE-ID, and specific content of an access point information attribute includes a CSE identifier of an access point for the AE and access information (accessInfo) of the AE.

Specifically, the registration resource of the AE may include one piece of access point information (pointOfAccess), or may include a plurality of pieces of pointOfAccess in a form of a list. When the registration resource of the AE is a list including a plurality of pieces of pointOfAccess, only access point information at a specific location in the list is information about an access point being used by the AE. Specifically, the specific location may be a first location in the list, may be a last location, or may be any location determined by the M2M platform.

The access information of the AE includes information about a local area network accessed by the AE (for example, an identifier (areaNwkId) of the local area network accessed by the AE and/or a type (areaNwkType) of the local area network) and access information (such as an access key (accessKey) and/or a local area network address (areaNwkAddress)) allocated to the AE by an access point (such as an M2M gateway in this embodiment) used by the AE. The access key (accessKey) and the local area network address (areaNwkAddress) are allocated by the access point (such as the M2M gateway) for the AE.

Figure 3B:
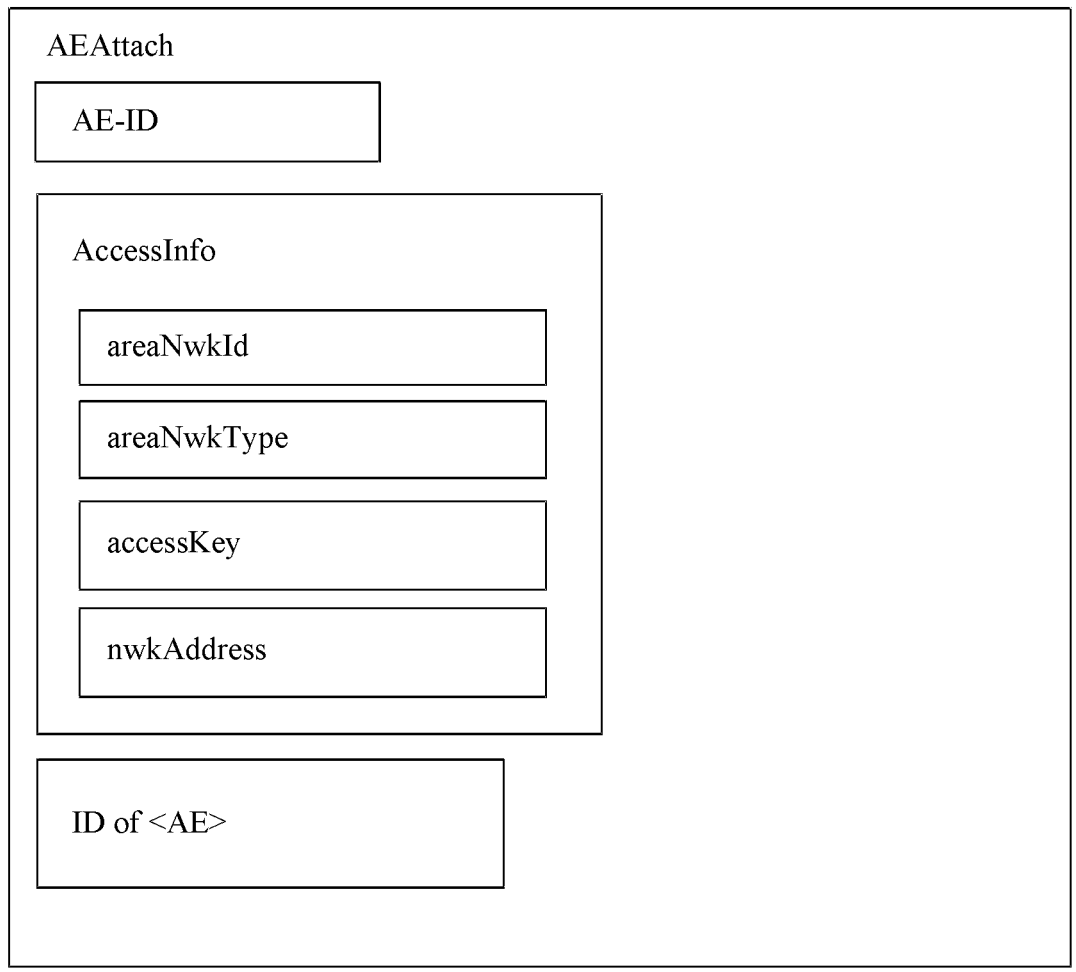
FIG. 3B is a schematic structural diagram of a connection resource of an AE that is stored on an M2M gateway according to an embodiment of the present embodiment.

FIG. 3B is a schematic diagram of a connection resource of an AE that is stored on an M2M gateway used as an access point for the AE.

The connection resource of the AE is a resource (for example, <AEAttach>) created and stored by the M2M gateway in a process in which the AE performs access point switching, for example, a process in which the access point is switched from an M2M platform to the M2M gateway. The connection resource of the AE includes an AE-ID, access information (accessInfo) of the AE, and an ID of a registration resource of the AE (ID of <AE>). Content included in the access information (accessInfo) of the AE is the same as content of the (accessInfo) stored in the CSE of the M2M platform in FIG. 3A. Details are not described herein again in this embodiment of the present embodiment.

The access point is an object at which a message sent by the AE first arrives when the AE uses a service provided by an M2M system. When sending a message to any device in the M2M system, the AE needs to first send the message to the access point for the AE, and then the access point forwards the message to another device in the M2M system. The access point stores the access information of the AE. When receiving a message that needs to be forwarded to the AE, the access point may find the AE through addressing by using the access information of the AE, and forward the message. The access point is usually a device in which a CSE is located, for example, the M2M gateway or the M2M platform.

Figure 3C:
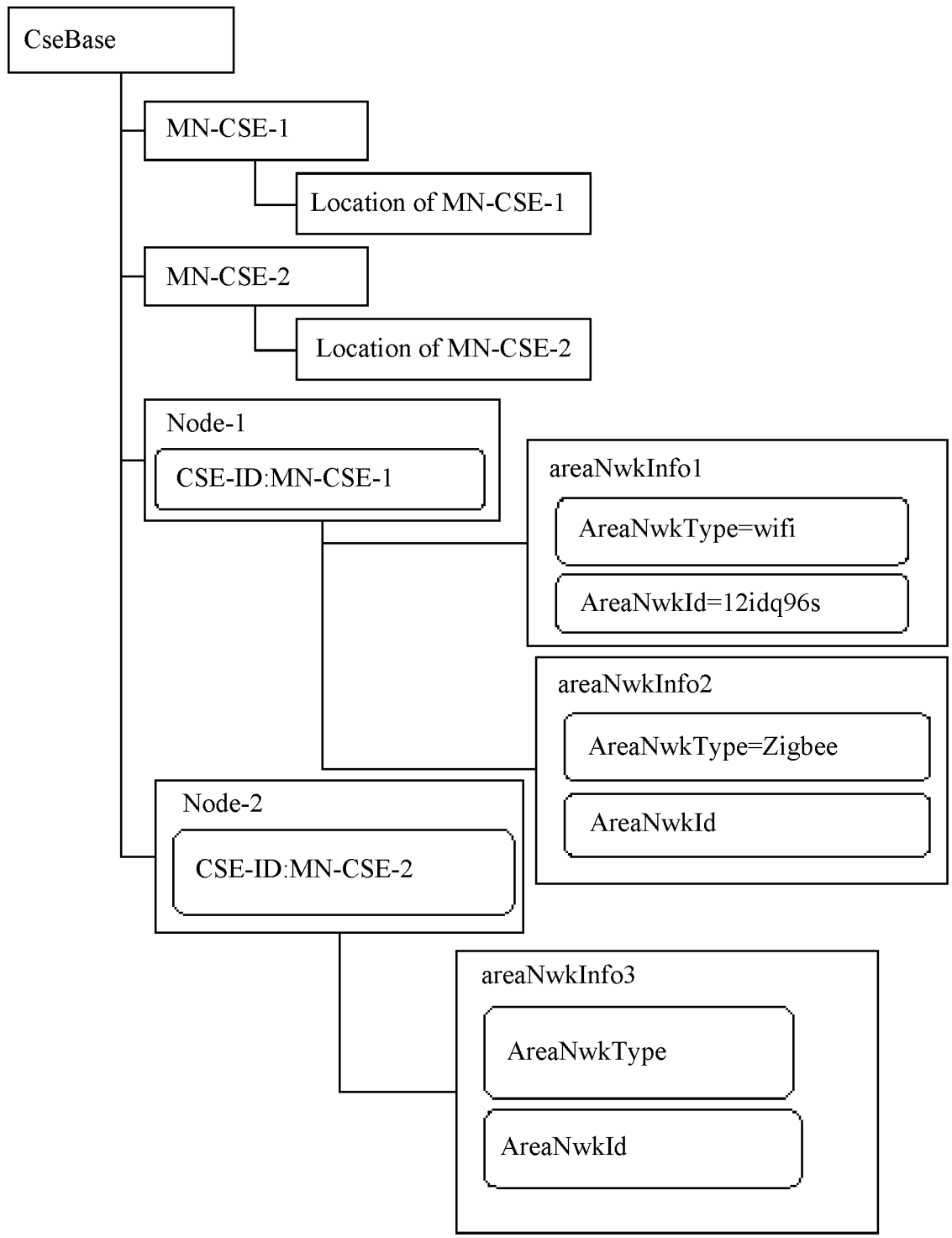
FIG. 3C is a schematic structural diagram of a Base resource stored on an M2M platform according to an embodiment of the present embodiment.

FIG. 3C is a schematic structural diagram of a CSEBase resource stored on an M2M platform. The CSEBase resource includes related information of all M2M gateways. Specifically, the CSEBase resource includes resources (such as MN-CSE-1 and MN-CSE-2) of all the M2M gateways, resources (such as Node-1 corresponding to the MN-CSE-1 and Node-2 corresponding to the MN-CSE-2) of nodes corresponding to all the M2M gateways, and resources (areaNwkInfo1 and areaNwkInfo2 in the Node-1, and areaNwkInfo3 in the Node-2) that are in the resources of all the nodes and that are of local area networks to which the M2M gateways corresponding to the nodes belong.

Further, for a resource (for example, the MN-CSE-1) of each M2M gateway, a CSE identifier of the M2M gateway is used as an identifier of the resource of the M2M gateway. The resource of the M2M gateway further includes location information (for example, Location of MN-CSE-1) of the M2M gateway. A resource (for example, the Node-1) of a node corresponding to the M2M gateway includes the CSE identifier (for example, the MN-CSE-1), which is used as an attribute, of the M2M gateway, and further includes a resource (for example, the areNwkInfo1 and the areNwkInfo2), which is used as a sub-resource of the resource of the node, of information about a local area network to which the M2M gateway belongs. As shown in FIG. 3C, the resource Node-1 corresponding to the resource MN-CSE-1 includes resources of information about two local area networks, indicating that a gateway on which the MN-CSE-1 is located belongs to two different local area networks. The resources (for example, the areaNwkInfo1) of the information about the local area networks to which the M2M gateway belongs include the information about the local area networks to which the M2M gateway belongs, for example, types (AreaNwkType) of the local area networks and identifiers (AreaNwkId) of the local area networks.

Figure 4A:
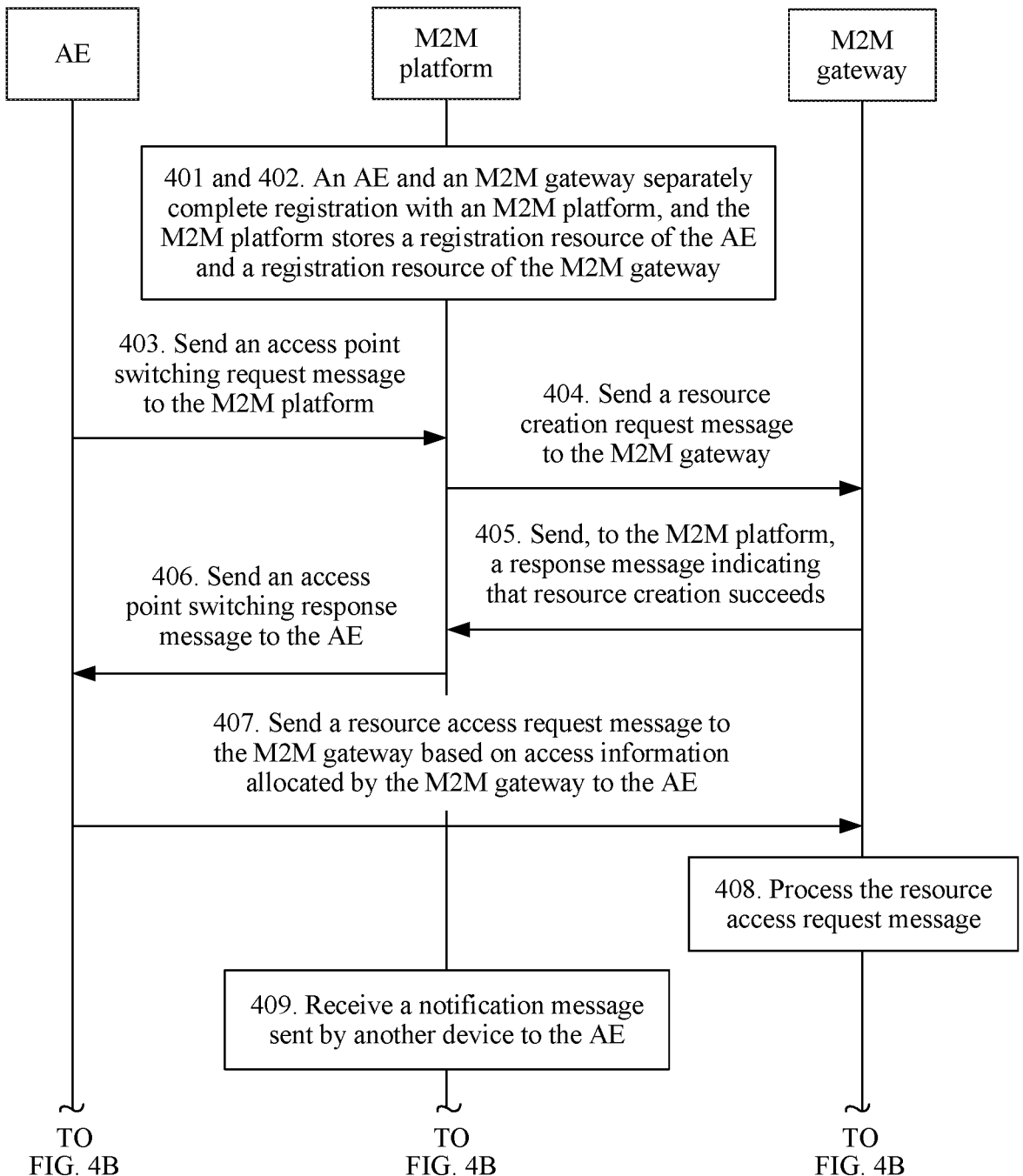
FIG. 4A and FIG. 4B are a flowchart of an access point switching method according to an embodiment of the present embodiment.
Figure 4B:
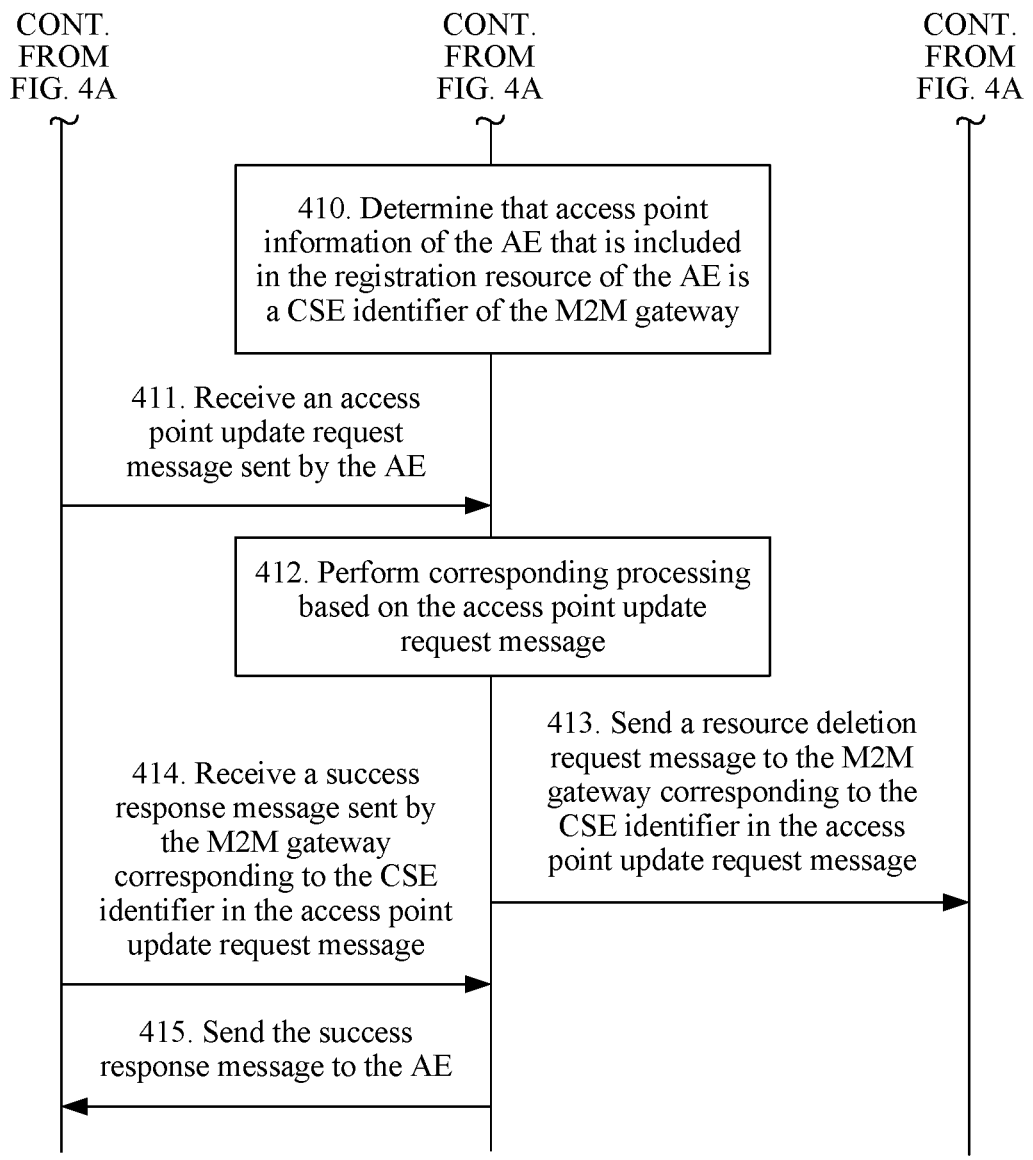

An embodiment of the present embodiment provides an access point switching method, to avoid interruption of another communication service that needs to be performed with an AE by using an M2M platform, thereby improving user experience. In this embodiment of the present embodiment, in an example, the M2M platform is an access point for the AE before the AE performs access point switching, an M2M gateway is an access point for the AE after the AE performs access point switching, and the M2M platform is used as an access point for the M2M gateway. As shown in FIG. 4A and FIG. 4B, the access point switching method includes the following steps.

401 and 402. The AE and the M2M gateway separately complete registration with the M2M platform, and the M2M platform stores a registration resource of the AE and a registration resource of the M2M gateway.

Specifically, the registration resource of the AE includes an AE-ID and access information of the AE (before access point switching is performed, a CSE identifier included in the access information of the AE is a CSE identifier of the M2M platform). The registration resource of the M2M gateway includes a CSE identifier of the M2M gateway and access information (namely the CSE identifier of the M2M platform) of the M2M gateway.

403. The AE sends an access point switching request message to the M2M platform.

Specifically, the AE sends the access point switching request message to the M2M platform (namely a registration server of the AE). The access point switching request message carries the CSE identifier (namely an identifier of a CSE of an access point obtained after switching) of the M2M gateway. The access point switching request message may be used to update access point information in the registration resource of the AE on the M2M platform.

In this embodiment of the present embodiment, the M2M platform is the registration server of the AE. The access point information of the AE includes the identifier (that is, the CSE identifier of the M2M gateway) of the CSE of the access point used for the AE after access point switching.

Optionally, the access point switching request message sent by the AE may further include access information of the AE in a local area network. Specifically, the access information includes a local area network identifier of the local area network accessed by the AE, or a local area network type supported by the AE. The access information of the AE indicates that the AE performs access by using an M2M gateway in a specific local area network. If the access point switching request message sent by the AE does not include the access information of the AE in the local area network, it indicates that the AE may receive access information allocated by the M2M gateway, for example, a key of a local area network that is allocated by the M2M gateway, or a network address of a local area network that is allocated by the M2M gateway.

It should be noted that, in the access information shown in FIG. 3A, areaNwkType and areaNwkId are alternative options. In other words, if the access information includes the parameter areaNwkType, the access information does not include the parameter areaNwkId. If the access information includes the parameter areaNwkId, the access information does not include the parameter areaNwkType.

In an example, if the access information of the AE includes the parameter areaNwkID, the access point switching request message may be, in a case in which the access point switching request message carries the access information,

```
Put /m2m.provider.com/CSEBase/AE HTTP/1.1
<?xml version="1.0" encoding="UTF-8"?>
<AE>
<pointOfAccess>
<CSE-ID>//www.m2mprovider.com /C3219</CSE-ID>
<accessInfo>
<areaNwkId>12idq96s </areaNwkId>
</accessInfo>
</pointOfAccess>
</AE>
```

/m2m.provider.com/CSEBase/AE is an identifier of the registration resource of the AE on the M2M platform. Put indicates that the registration resource of the AE on the M2M platform needs to be updated. <pointOfAccess> indicates that the request message carries the access point information of the AE.

Specifically, a value of the attribute <CSE-ID> is //www.m2mprovider.com/C3219</CSE-ID>, indicating the M2M gateway corresponding to the CSE identifier of the access point obtained after switching. In this example, the CSE identifier is //www.m2mprovider.com/c3219, and the attribute <areaNwkId> is a local area network identifier of a network to which the access point obtained after switching belongs. In this example, the local area network identifier of the network to which the access point obtained after switching belongs is 12idq96s.

In another example, the access point switching request message may alternatively not include the attribute <areaNwkId>, but include the attribute <areaNwkType>. In this example, a local area network type is Wireless Fidelity (English full name: Wireless Fidelity, WiFi for short).

404. The M2M platform sends a resource creation request message to the M2M gateway.

The resource creation request message is used to request the M2M gateway to create a connection resource (AEAttach) of the AE, and the resource creation request message includes the AE-ID.

Optionally, if the access point switching request may further include the access information (for example, a local area network identifier or a local area network type obtained after the AE performs access point switching) of the AE in step 403, the M2M platform further needs to store the access information of the AE in the access point information of the AE before or after performing step 404. Specifically, the local area network identifier or the local area network type obtained after the AE performs access point switching may be stored in the access information (AccessInfo) in the access point information (pointOfAccess) of the AE.

In this embodiment of the present embodiment, because the AE needs to use the M2M gateway as an access point for an M2M service, the M2M platform needs to send the resource creation request message to the M2M gateway, so that the M2M gateway creates the connection resource of the AE, and the M2M gateway can send, to the AE based on the connection resource of the AE, an M2M service corresponding to the AE. As shown in step 403, the access information of the AE may include a local area network identifier of a network to which the M2M gateway belongs or a network type of a network to which the M2M gateway belongs. In this embodiment of the present embodiment, if the access information of the AE is the local area network identifier of the network to which the M2M gateway belongs, the resource creation request message sent by the M2M platform is:

```
POST /m2m.provider.com/transfer HTTP/1.1
<?xml version="1.0" encoding="UTF-8"?>
<AEAttach>
<AE-ID> Sa3e3f3ab </AE-ID>
<accessInfo>
<areaNwkId>12idq96s </areaNwkId>
</accessInfo>
<IDofAE>//www.m2mprovider.com/CSEBase/AE</IDofAE>
</AEAttach>
```

Specifically, POST indicates that the connection resource of the AE needs to be created on the M2M gateway. The parameter /m2m.provider.com/transfer is an identifier of a resource on the M2M gateway, and Sa3e3f3ab is the AE-ID. The parameter 12idq96s is the local area network identifier of the network to which M2M gateway accessed by the AE belongs.

In another example, if the access information of the AE is the local area network type of the network to which the M2M gateway belongs, the resource creation request message is:

```
POST /m2m.provider.com/transfer HTTP/1.1
Host: exampleMN.com
<?xml version="1.0" encoding="UTF-8"?>
<AEAttach>
<AE-ID> Sa3e3f3ab</AE-ID>
<accessInfo>
<areaNwkType>Wifi </areaNwkType>
...
</accessInfo>
...
</AEAttach>
```

Specifically, POST indicates that the connection resource of the AE needs to be created on the M2M gateway. The parameter /m2m.provider.com/transfer is an identifier of a resource on the M2M gateway. Sa3e3f3ab is the AE-ID. The parameter Wifi is the local area network type of a network that is supported by the AE.

405. The M2M gateway sends, to the M2M platform, a response message indicating that resource creation succeeds.

Specifically, after receiving the connection resource creation request sent by the M2M platform, the M2M gateway creates the connection resource, and the M2M gateway returns, to the M2M platform, the response message indicating that the connection resource creation succeeds.

Specifically, for content included in an AEAttach resource created by the M2M gateway, refer to FIG. 3B. Details are not described in this embodiment of the present embodiment.

In an example, if the resource creation request message includes access information (accessInfo), the M2M gateway allocates the access information (refer to information in accessInfo in FIG. 3A or FIG. 3B) to the AE based on areaNwkId or areaNwkType in the accessInfo, in other words, allocates a local area network address (areaNwkAddress) of the AE in the local area network and an access key (accessKey) of the AE in the local area network. The access information allocated by the M2M gateway to the AE may enable the AE to be successfully connected to the local area network to which the M2M gateway belongs. If the resource creation request message does not include accessInfo, the M2M gateway allocates access information to the AE based on a local area network type, for example, WiFi, supported by the M2M gateway.

In this embodiment of the present embodiment, if the access information of the AE includes the local area network identifier of the network to which the M2M gateway belongs, the M2M gateway allocates the local area network address of the AE in the local area network based on the local area network identifier of the local area network to which the M2M gateway belongs.

In this embodiment of the present embodiment, if the access information of the AE includes the local area network type of the network to which the M2M gateway belongs, the M2M gateway allocates the local area network address of the AE in the local area network based on the local area network type of the local area network to which the M2M gateway belongs.

In this embodiment of the present embodiment, after creating the AEAttach resource, the M2M gateway returns, to the M2M platform, the response message indicating that resource creation succeeds. The response message indicating that the creation succeeds includes access information (for example, the local area network address (areaNwkAddress) and the access key (accessKey)) that is in the successfully created AEAttach resource and that is allocated by the M2M gateway to the AE. In this embodiment of the present embodiment, the M2M platform records, in AccessInfo shown in FIG. 3A, the access information allocated by the M2M gateway to the AE.

In an example, the response message indicating that resource creation succeeds that is sent by the M2M gateway to the M2M platform may be:

```
HTTP/1.1 201 Created
Content-Type: application/xml
Date: Tue, 24 Nov 2015 02:55:59 GMT
<?xml version="1.0" encoding="UTF-8"?>
<AEAttach>
<AE-ID>//www.m2mprovider.com/Sa3e3f3ab</AE-ID>
<accessInfo>
<areaNwkId>12idq96s </areaNwkId>
<areaNwkAddress>10.136.79.43 </areaNwkAddress>
<areaNwkKey>helloworld </areaNwkKey>
...
</accessInfo>
...
</AEAttach>
```

Specifically, the response message indicating that resource creation succeeds includes connection information (accessInfo) of the AE, and the accessInfo includes areaNwkId, areaNwkAddress, and areaNwkKey. The areaNwkId is 12idq96s, the areaNwkAddress is 10.136.79.43, and the areaNwkKey is helloworld.

406. The M2M platform sends an access point switching response message to the AE.

The access point switching response message carries the access information allocated by the M2M gateway to the AE.

The access point switching response message includes access point information (pointOfAccess) of the AE that is obtained after switching.

Specifically, after receiving the response message indicating that resource creation succeeds that is returned by the M2M gateway, and before or after sending the access point switching response message to the AE, the M2M platform further records, in the accessInfo in the access point information (pointOfAccess) of the AE that is stored on the M2M platform, the access information (the local area network address (areaNwkAddress) and the access key (accessKey)) that is included in the response message indicating that resource creation succeeds and that is allocated by the M2M gateway to the AE.

Specifically, the M2M platform records, in the accessInfo in the access point information of the AE, the access information allocated by the M2M gateway to the AE; or the M2M platform adds a piece of information at a specific location of an access point information list of the AE, and records, in the access point information added at the specific location, the access information allocated by the M2M gateway to the AE.

In this embodiment of the present embodiment, the AE sends the access point switching request message to the M2M platform, and the M2M platform records, in the access point information (pointOfAccess) of the AE, the CSE identifier corresponding to the M2M gateway and the access information of the AE, and sends, to the AE, the success response message carrying the access information (such as the local area network address and the access key) allocated by the M2M gateway, so that the AE may be connected to the M2M gateway based on the information in the success response message.

In this embodiment of the present embodiment, if the access information of the AE that is in the resource creation request message includes the local area network identifier of the local area network to which the M2M gateway belongs, the access point switching response message may be:

```
HTTP/1.1 200 OK
Content-Type: application/xml
Date: Tue, 24 Nov 2015 02:56:01GMT
<?xml version="1.0" encoding="UTF-8"?>
...
<AE>
<accessInfo>
<CSE-ID>//www.m2mprovider.com /C3219</CSE-ID>
<areaNwkId>12idq96s </areaNwkId>
<areaNwkAddress>10.136.79.43 </areaNwkAddress>
<areaNwkKey>helloworld </areaNwkKey> ...
</accessInfo>
</AE>
```

If the access information of the AE that is in the resource creation request message includes the local area network type of the network to which the M2M gateway belongs, the access point switching response messages includes the local area network type of the network to which the M2M gateway belongs.

An access point switching response message including the local area network type of the network to which the M2M gateway belongs is similar to the access point switching response message including the local area network identifier of the network to which the M2M gateway belongs, and <areaNwkId>12idq96s </areaNwkId> in the foregoing program needs to be replaced with <areaNwkType>Wifi </areaNwkType>.

So far, a procedure of access point switching for the AE may be completed. The AE may directly use, by using the M2M gateway as the access point for the AE, a service provided in the architecture shown in FIG. 1B. For example, the AE may access a resource in an M2M system by using the M2M gateway, and receive a notification message sent by another service entity to the AE by using the M2M platform used as the access point for the AE, or access a resource on a device on which the AE is located.

Continuing to refer to FIG. 4A and FIG. 4B, after the access point switching is completed, a procedure in which the AE initiates a resource access to the M2M gateway by using the M2M gateway as the access point for the AE includes the following steps.

407. The AE sends a resource access request message to the M2M gateway based on access information allocated by the M2M gateway to the AE.

The access information allocated by the M2M gateway to the AE may be a connection address corresponding to the M2M gateway, and the resource access request message includes an identifier of a to-be-accessed resource.

In an example, the resource access request message may be:

```
GET /m2m.provider.com/CSE221/container/contentinstance HTTP/1.1
X-M2M-Origin: Sa3e3f3ab
``` where GET indicates an obtain operation, HTTP/1.1 indicates that the obtain operation follows the release HTTP 1.1, and m2m.provider.com/CSE221/container/contentinstance is the identifier of the to-be-accessed resource (for example, a URI of the resource).

408. After receiving the resource access request message sent by the AE based on the access information allocated by the M2M gateway to the AE, the M2M gateway processes the resource access request message.

In this embodiment of the present embodiment, the M2M gateway processes the resource access request message based on the identifier of the to-be-accessed resource that is in the resource access request message.

Specifically, the M2M gateway may determine, based on an identifier (namely CSE221) that may be learned of from the identifier (m2m.provider.com/CSE221/container/contentinstance) of the to-be-accessed resource and that is of a CSE in which the to-be-accessed resource is located, that the identifier of the to-be-accessed resource is not stored on the M2M gateway used as the access point for the AE. Therefore, the M2M gateway sends the resource access request message to an entity that stores the to-be-accessed resource, namely an entity in which the CSE whose CSE identifier is CSE221 is located.

Specifically, a manner in which after the M2M gateway receives the resource access request message, the M2M gateway forwards the resource access request message to the entity that stores the to-be-accessed resource belongs to the prior art, and details are not described in this embodiment of the present embodiment.

In another optional manner, if the M2M gateway determines, based on the identifier of the to-be-accessed resource that is in the resource access request message, that the to-be-accessed resource is stored on the M2M gateway, the M2M gateway directly performs corresponding processing based on the resource access request message.

That the M2M gateway used as the access point for the AE determines whether the to-be-accessed resource is stored on the M2M gateway used as the access point for the AE is specifically: determining, by the M2M gateway used as the access point for the AE, whether the identifier that is in the resource access request and that is of the CSE in which the to-be-accessed resource is located is the same as the CSE identifier of the M2M gateway used as the access point. If the identifier of the CSE in which the to-be-accessed resource is located is the same as the CSE identifier of the M2M gateway used as the access point, the to-be-accessed resource is stored on the M2M gateway used as the access point for the AE. If the identifier of the CSE in which the to-be-accessed resource is located is different from the CSE identifier of the M2M gateway used as the access point, the to-be-accessed resource is not stored on the M2M gateway used as the access point for the AE.

In another optional manner, if the M2M gateway determines, based on the identifier of the to-be-accessed resource that is in the resource access request message, that the to-be-accessed resource is stored on the M2M gateway, the M2M gateway directly performs corresponding processing based on the resource access request message.

Further, a manner in which the M2M gateway performs corresponding processing based on the resource access request message belongs to the prior art, and details are not described in this embodiment of the present embodiment. After the AE completes the access point switching, in a period in which a CSE of the M2M gateway is used as the access point for the AE, a service (for example, a weather forecast service) previously subscribed by the AE continues to send a notification message to the AE. Steps 409 and 410 are a process in which after the AE completes the access point switching, another service entity in an M2M system architecture sends a notification message to the AE in a period in which the M2M gateway corresponding to the CSE identifier is used as the access point for the AE, and the process specifically includes the following steps.

409. The M2M platform receives a notification message sent by another device to the AE.

The notification message carries the AE-ID. The another device is a device in which a resource subscribed by the AE is located.

For example, after the resource (for example, a weather forecast resource) subscribed by the AE changes, a device (a weather forecast server) in which the resource subscribed by the AE is located sends a notification message to the AE, to inform a latest status of the resource after the change.

When the AE subscribes the resource, a registrar CSE for the AE that is recorded in the device in which the resource subscribed by the AE is located is a CSE of the M2M platform, and therefore, the device in which the resource subscribed by the AE is located still sends the notification message to the M2M platform.

In an example, the notification message may be:

```
POST /m2m.provider.com/Sa3e3f3ab HTTP/1.1
<?xml version="1.0" encoding="UTF-8"?>
<contentInstance>          /contentInstance resource part starts
<content>cloudy</content>  /specific content of content
...
<contentInstance>          /contentInstance resource part ends
```

Specifically, POST indicates a create operation, and <content>cloudy</content> indicates that content of the resource subscribed by the AE is 'cloudy'.

410. After receiving the notification message sent to the AE, the M2M platform determines, based on an AE-ID in the notification message, that access point information of the AE that is included in the registration resource of the AE is a CSE identifier of the M2M gateway.

Specifically, after the M2M platform determines, based on the AE-ID in the notification message, that the access point information of the AE that is included in the registration resource of the AE is the CSE identifier of the M2M gateway, the M2M platform sends the notification message to the M2M gateway, so that the M2M gateway sends the received notification message to the AE based on the AE-ID in the notification message.

Further, the M2M platform may receive the notification message sent by the another entity to the AE, can determine, based on the AE-ID in the notification message, that the access point information of the AE is the CSE identifier of the M2M gateway, and send the notification message to the M2M gateway, so that the M2M gateway sends the notification message to the AE. Therefore, the AE can obtain a latest status of a previously subscribed service. Then, the another entity can still communicate with the AE after the AE performs access point switching.

It should be noted that there is no time sequence between steps 407 and 408 and steps 409 and 410. Steps 407 and 408 may be first performed, and then steps 409 and 410 are performed. Alternatively, steps 409 and 410 may be first performed, and then steps 407 and 408 are performed. This is not limited in this embodiment of the present embodiment.

Further, after the AE leaves the local area network to which the M2M gateway belongs, the access point information of the AE changes, and the AE requests the M2M platform to update the access point for the AE. Steps 411 to 415 are a process in which the M2M platform updates the access point for the AE after the AE leaves the local area network to which the M2M gateway belongs, and the process specifically includes the following steps.

411. The M2M platform receives an access point update request message sent by the AE.

In this embodiment of the present embodiment, when the access point information of the AE changes, the AE sends the access point update request message to the M2M platform. In an example, the access point update request message may be:

```
PUT/m2m.provider.com/CSEBase/AE HTTP/1.1
<?xml version="1.0" encoding="UTF-8"?>
...
<AE>
<pointOfAccess>
http://218.22.134.1:8080
</pointOfAccess>
</AE>
```

Specifically, PUT indicates that the access point information of the AE on the M2M platform needs to be updated, http://218.22.134.1 is an IP address corresponding to the AE, 8080 is a port number, and </pointOfAccess> indicates that the access point update request message carries the access point information of the AE.

Specifically, the access point update request message in step 411 may further carry the IP address and the port number that are corresponding to the AE. In other words, the access point update request message is a first access point update request message, and is used by the M2M platform to replace the access point information of the AE with access point information including the IP address and information about the port number.

Further, the access point update request message in step 411 may further carry a CSE identifier recorded at a specific location in the access point information list and information instructing to delete the CSE identifier recorded at the specific location. In other words, the access point update request message is a second access point update request message. The access point update request is used to delete access point information that is in the access point information list and that includes the CSE identifier in the access point update request message. The first access point update request message is used by the M2M platform to replace, with the IP address and the port number that are corresponding to the AE, the access point information included in the registration resource of the AE. For example, the IP address and the port number that are corresponding to the AE may be http://ADN-server:8080. The second access point update request message is used to delete the CSE identifier recorded at the specific location in the access point information list included in the registration resource of the AE. The 'first' and the 'second' in the patent represent two different access point update request messages, and do not represent a sequence of the access point update request messages.

The specific location may be a first item in the access point information list, may be a last item, or may be any item in the access point information list.

412. The M2M platform performs corresponding processing based on the access point update request message.

Specifically, the M2M platform replaces the access point information (the IP address and the information about the port number that are of the AE) in the <AE> resource with the access point information in the update request message.

Specifically, the M2M platform replaces the access point information in the <AE> resource with the IP address and the port number that are of the AE.

Alternatively, the M2M platform deletes the access point information at the specific location in the access point information list included in the <AE> resource. In other words, the deleted access point information includes the CSE identifier included in the access point update request message.

Further, after receiving the access point update request message sent by the AE, the M2M platform replaces the access point information in the <AE> resource with the IP address and the port number that are of the AE, or deletes the access point information at the specific location in the access point information list in the <AE> resource. Therefore, when the AE leaves a coverage area of a current access point, the M2M platform can enable the AE to access another access point corresponding to the AE, so that the AE can access a resource stored in the another access point.

413. The M2M platform sends a resource deletion request message to an M2M gateway corresponding to a CSE identifier of the M2M gateway that is in deleted or replaced access point information.

The M2M gateway corresponding to the CSE identifier of the M2M gateway that is in the deleted or replaced access point information is the M2M gateway used as the access point for the AE before the access point is updated.

Specifically, the resource deletion request message carries an identifier of the connection resource of the AE, and is used to request the M2M gateway to delete the connection resource of the AE.

In this embodiment of the present embodiment, the M2M gateway deletes, based on the identifier of the connection resource of the AE, the connection resource of the AE that is created by the M2M gateway.

414. The M2M platform receives a success response message sent by the M2M gateway corresponding to the CSE identifier in the access point update request message.

The success response message is a success response message that is sent by the M2M gateway and that is of deleting the connection resource of the AE. In addition, the success response message is used to represent that the connection resource of the AE is deleted.

415. The M2M platform sends the success response message to the AE.

The success response message is a response message of successfully updating the access point. Further, the success response message may further carry the connection resource of the AE.

Further, the M2M platform sends the resource deletion request message to the M2M gateway used as the access point for the AE before the access point is updated, so that the connection resource of the AE on the M2M gateway is deleted, thereby saving storage space of the M2M gateway.

Figure 5:
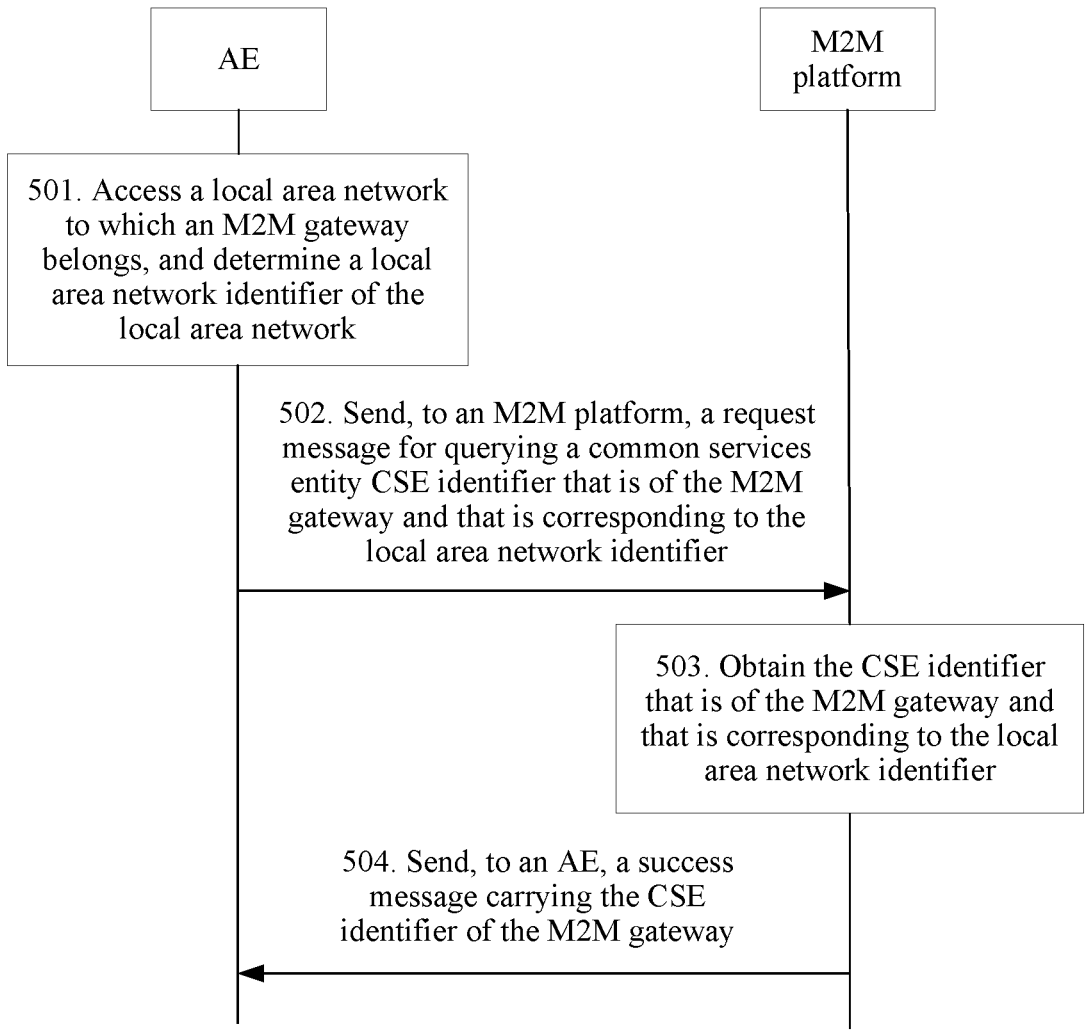
FIG. 5 is a flowchart of a method for obtaining a CSE identifier of an M2M gateway after an AE enters a local area network to which the M2M gateway belongs according to an embodiment of the present embodiment.

FIG. 5 is a flowchart of a method used by an AE for finding an M2M gateway and obtaining an identifier of the M2M gateway according to an embodiment of the present embodiment. The method includes the following steps.

501. The AE accesses a local area network to which the M2M gateway belongs, and determines a local area network identifier of the local area network.

For example, the network identifier of the local area network may be areaNwkId=12idq96s.

It should be noted that a manner used by the AE to access the local area network to which the M2M gateway belongs, and determine the local area network identifier of the local area network belongs to the prior art, and details are not described in this embodiment of the present embodiment.

502. After determining the local area network identifier of the accessed local area network, the AE sends, to an M2M platform, a request message for querying a common services entity CSE identifier that is of the M2M gateway corresponding to the local area network identifier.

The request message for querying the CSE identifier that is of the M2M gateway corresponding to the local area network identifier carries the local area network identifier of the local area network accessed by the AE, and the request message for querying the CSE identifier that is of the M2M gateway corresponding to the local area network identifier is used to obtain the CSE identifier of the M2M gateway.

For example, the local area network identifier of the local area network accessed by the AE may be 12idq96s.

The request message for querying the CSE identifier that is of the M2M gateway corresponding to the local area network identifier is used to request the M2M platform to query the CSE identifier that is of the M2M gateway corresponding to the local area network identifier.

In an example, the request message for querying the CSE identifier that is of the M2M gateway corresponding to the local area network identifier is as follows:

GET/m2m.provider.com/networkChoose?areaNwkId=12idq96sHTTP/1.1

In other words, the CSE identifier of the M2M gateway in the local area network whose local area network identifier is 12idq96s is obtained.

503. After receiving the request message for querying the CSE identifier that is of the M2M gateway corresponding to the local area network identifier, the M2M platform obtains, based on the local area network identifier in the request message for querying the CSE identifier that is of the M2M gateway corresponding to the local area network identifier, the CSE identifier that is of the M2M gateway corresponding to the local area network identifier.

Specifically, the M2M platform stores a correspondence between a local area network identifier and a CSE identifier of an M2M gateway in a local area network. In an example, as shown in FIG. 3C, a CSEBase resource includes a node resource (node resource) corresponding to each M2M gateway, and a resource that is in each node resource (node resource) and that is of a local area network to which an M2M gateway corresponding to the node belongs. An areaNwkType attribute and an areaNwkId attribute included in an areaNwkInfo resource respectively store a local area network type and a local area network identifier.

Therefore, the M2M platform may query, based on the local area network identifier in the request message for querying the CSE identifier that is of the M2M gateway corresponding to the local area network identifier, the CSE identifier that is of the M2M gateway corresponding to the local area network identifier. A specific query method is described in the prior art, and details are not described herein in this embodiment of the present embodiment.

504. The M2M platform sends, to the AE, a success message carrying the CSE identifier of the M2M gateway.

Further, the AE determines the local area network identifier of the network to which the M2M gateway belongs, and sends, to the M2M platform, a query request carrying the local area network identifier, so that the M2M platform can determine, based on the local area network identifier, the CSE identifier of the M2M gateway that the AE needs to access, thereby determining that an access point obtained after switching is the M2M gateway corresponding to the CSE identifier. Then, the AE may access the M2M gateway, and access a resource stored on the M2M gateway.

Figure 6:
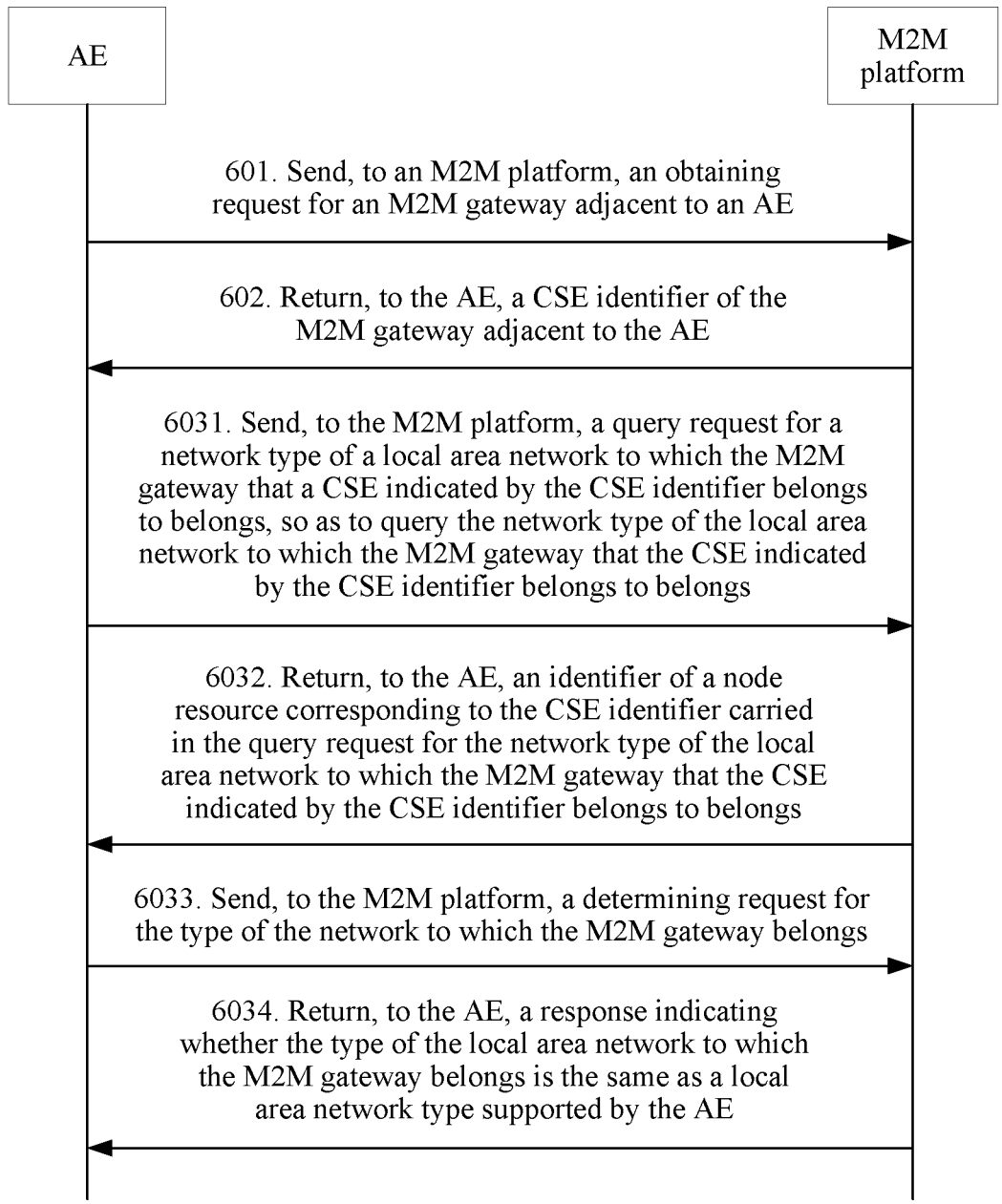
FIG. 6 is a flowchart of a method for obtaining an identifier of an M2M gateway after an AE enters a location covered by a local area network to which the M2M gateway belongs according to an embodiment of the present embodiment.

FIG. 6 is a flowchart of another method used by an AE for finding an M2M gateway and obtaining an identifier of the M2M gateway according to an embodiment of the present embodiment. In the method, a procedure in which the AE moves to a coverage area of a local area network to which the M2M gateway belongs, and determines a CSE identifier of the accessed M2M gateway based on a local area network type supported by the AE includes the following steps.

601. The AE sends, to an M2M platform, an obtaining request for an M2M gateway adjacent to the AE.

The obtaining request for the M2M gateway adjacent to the AE carries location information of the AE and information about an area covered by a local area network corresponding to the local area network type supported by the AE.

Specifically, the M2M gateway adjacent to the AE is an M2M gateway in an area whose center is a location of the AE and whose radius is the information about the area covered by the local area network corresponding to the local area network type supported by the AE.

Specifically, the AE first determines the location at which the AE is located and the local area network type supported by the AE. Then, the information about the area covered by the local area network is determined based on the local area network type supported by the AE. For example, a radius of an area covered through Bluetooth is 30 m, and a radius of an area covered through WiFi is 100 m.

In this embodiment of the present embodiment, when the AE moves to a coverage area of a local area network to which an M2M gateway belongs, but cannot obtain a local area network identifier of the local area network, the AE may send, to the M2M platform, the obtaining request for the M2M gateway adjacent to the AE.

The obtaining request for the M2M gateway adjacent to the AE carries the location information of the AE, so as to obtain a CSE identifier of the M2M gateway adjacent to the AE.

For example, the local area network type supported by the AE may be areaNwkType=WiFi.

In an example, the AE may obtain the location information of the AE, for example, longitude and latitude coordinates (X, Y) corresponding to the AE, by using a GPS module or a location server of the AE.

602. After receiving the obtaining request for the M2M gateway adjacent to the AE that is sent by the AE, the M2M platform returns, to the AE based on location information of the AE and information about an area covered by a local area network, a CSE identifier of the M2M gateway adjacent to the AE.

Specifically, the M2M platform determines, based on the location information of the AE, the M2M gateway adjacent to the AE.

In an example, the AE sends, to the M2M platform, the obtaining request for the M2M gateway adjacent to the AE, so as to obtain the CSE identifier of the gateway adjacent to the AE, and the obtaining request for the M2M gateway adjacent to the AE may be:

GET/m2m.provider.com/CSEBase?N=30&w=125&r=30 HTTP/1.1

/m2m.provider.com/CSEBase is an ID of an M2M gateway resource stored on the M2M platform. N=30&w=125 is the location information of the AE, and is specifically 30 degrees north latitude and 125 degrees west longitude. An area with r=30 is an area whose center is the AE and whose radius is 30 M.

603. After the AE receives the CSE identifier of the M2M gateway adjacent to the AE that is returned by the M2M platform, the AE determines an M2M gateway that is in the M2M gateway adjacent to the AE and that supports a local area network type supported by the AE.

Specifically, a procedure in which the AE determines the M2M gateway that is in the M2M gateway adjacent to the AE and that supports the local area network type supported by the AE may specifically include steps 6031 to 6034.

6031. The AE sends, to the M2M platform, a query request for a network type of a local area network to which the M2M gateway corresponding to the CSE identifier belongs, so as to query the network type of the local area network to which the M2M gateway that the CSE indicated by the CSE identifier belongs to belongs.

In an example, the query request for the network type of the local area network to which the M2M gateway corresponding to the CSE identifier belongs may be:

```
GET
http://m2m.serviceprovider.com/CSEBase?resourceType=Node&hostedCSEID=CSE_ID                      HTTP/1.1
```

The parameter http://m2m.serviceprovider.com/CSEBase indicates an identifier of a resource that needs to be queried by the AE. The parameter resourceType=Node indicates that a resource of a node type in a CSEBase resource is queried. hostedCSEID=CSE ID indicates that a CSE ID included in the queried node resource is the same as the CSE ID.

It should be noted that the node resource is a defined resource related to a node. One node represents one M2M node, and may be a platform node (IN) or a gateway node (MN). One node includes one CSE. For example, the IN includes an IN-CSE, and the MN includes an MN-CSE. The node resource has a hostedCSEID attribute, and a value of the hostedCSEID attribute is a CSE ID corresponding to the node. Each node resource is corresponding to at least an AreaNwkInfo resource. Each AreaNwkInfo resource includes an attribute AreaNwkType and an attribute AreaNwkId, and a value of the attribute AreaNwkType is a local area network type. If a node belongs to a plurality of local area networks, a node resource corresponding to the node is corresponding to a plurality of AreaNwkInfo resources.

6032. The M2M platform returns, to the AE, an identifier of a node resource corresponding to the CSE identifier carried in the query request for the network type of the local area network to which the M2M gateway corresponding to the CSE identifier belongs.

6033. The AE sends, to the M2M platform, a determining request for the type of the network to which the M2M gateway belongs.

The determining request for the type of the network to which the M2M gateway belongs carries the identifier of the node resource to which the CSE identifier of the M2M gateway belongs, and the local area network type supported by the AE.

In an example, the determining request for the type of the network to which the M2M gateway belongs may be: GET http://m2m.serviceprovider.com/CSEBase/node?areaNwkType=wifi The parameter http://m2m.serviceprovidercom/CSEBase/node is the identifier of the node resource to which the CSE identifier of the M2M gateway belongs. The parameter areaNwkType=wifi is the local area network type supported by the AE. The determining request for the type of the network is used to determine whether the type of the local area network to which the M2M gateway belongs is the same as the local area network type supported by the AE.

6034. The M2M platform returns, to the AE, a response indicating whether the type of the local area network to which the M2M gateway belongs is the same as the local area network type supported by the AE.

Specifically, if a network type of any local area network to which the M2M gateway belongs is the same as the local area network type supported by the AE, an 'OK' success response is returned. If network types of all local area networks to which the M2M gateway belongs are different from the local area network identifier supported by the AE, an 'unsupported' response is returned.

Further, if the AE receives the 'unsupported' response in step 6034, the AE further needs to determine a type of a local area network to which another gateway in the M2M gateway adjacent to the AE belongs. Steps 6031 to 6034 are repeatedly performed until an M2M gateway belonging to a local area network whose type is the same as the local area network type supported by the AE is determined, that is, the AE finally determines the CSE identifier corresponding to the M2M gateway.

In this embodiment of the present embodiment, steps 6031 to 6034 are a detailed optional manner of step 603.

In another optional manner, the procedure in which the AE determines the M2M gateway that is in the M2M gateway adjacent to the AE and that supports the local area network type supported by the AE may alternatively be: 6031'. The AE sends, to the M2M platform, a request for querying a CSE identifier of an M2M gateway that belongs to a local area network whose type is the same as the local area network type supported by the AE, so as to query the CSE identifier of the M2M gateway that is in the M2M gateway adjacent to the AE and that supports the local area network type supported by the AE. The query request carries the CSE identifier of the M2M gateway adjacent to the AE.

In an example, the request for querying the CSE identifier of the M2M gateway that belongs to the local area network whose type is the same as the local area network type supported by the AE may be:

GET
http://m2m.serviceprovider.com/CSEBase?areaNwkType=wifi&hostedCSEID=CSE_ID1#CSE_ID2#CSE_ID3

The parameter //m2m.serviceprovider.com/CSEBase is an identifier of a CSEBase resource recording a local area network type and a local area network identifier that are corresponding to each CSE identifier in FIG. 3C, and is used to instruct the M2M platform to query the resource. The parameter areaNwkType=wifi indicates that a queried local area network type is WiFi, and the parameter hostedCSEID=CSE_ID1 #CSE_ID2 #CSE_ID3 indicates CSE identifiers of M2M gateways adjacent to the AE.

6032'. After receiving the request sent by the AE for querying the CSE identifier of the M2M gateway that supports the local area network type supported by the AE, the M2M platform determines, in the resource indicated by //m2m.serviceprovider.com/CSEBase, local area network types respectively supported by the M2M gateways corresponding to CSE ID1 #CSE_ID2 #CSE_ID3 carried in the request, and returns, to the AE, the CSE identifier of the M2M gateway that belongs to the local area network whose type is the same as the local area network type supported by the AE.

Further, after receiving the request in step 6031 or 6031', the M2M platform records, in access information of the AE that is in a registration resource of the AE, the type of the local area network to which the M2M gateway belongs.

Steps 6031' and 6032' are another detailed optional manner of step 603.

Further, the AE sends, to the M2M platform, the location information of the AE and the local area network type supported by the AE, so that the M2M platform can determine, based on the foregoing information, the M2M gateway corresponding to the local area network type supported by the AE, so as to determine the M2M gateway that can be accessed by the AE. Then, the AE may access the M2M gateway, and access a resource stored on the M2M gateway.

Figure 7:
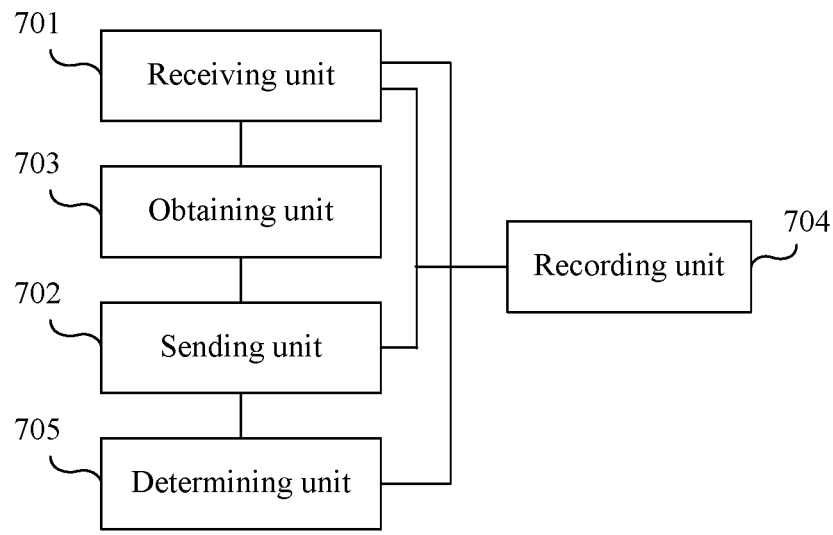
FIG. 7 is a schematic structural diagram of an apparatus of an M2M platform according to an embodiment of the present embodiment.

As shown in FIG. 7, an embodiment of the present embodiment further provides a schematic structural diagram of an apparatus of an M2M platform. The apparatus 700 includes a receiving unit 701, a sending unit 702, an obtaining unit 703, a recording unit 704, and a determining unit 705.

The receiving unit 701 is configured to receive an access point switching request message sent by an AE, where the access point switching request message carries a common services entity CSE identifier of an M2M gateway.

The sending unit 702 is configured to send a resource creation request message to the M2M gateway, where the resource creation request message is used to request the M2M gateway to create a connection resource of the AE, and the resource creation request message carries an AE-ID.

The receiving unit 701 is further configured to receive a response message indicating that resource creation succeeds that is sent by the M2M gateway, where the response message indicating that resource creation succeeds carries access information allocated by the M2M gateway to the AE.

The sending unit 702 is further configured to send an access point switching response message to the AE, where the access point switching response message carries the access information allocated by the M2M gateway to the AE.

Further, the receiving unit 701 is configured to perform steps 409, 411, 414, 602, and the like that are performed by an M2M platform in FIG. 4A to FIG. 6. The sending unit 702 is configured to perform steps 404, 406, 407, 413, 415, and 504 that are performed by the M2M platform in FIG. 4A to FIG. 6. Details are not described herein again in this embodiment of the present embodiment.

Further, the recording unit 704 is configured to: replace information included in access point information of the AE with the CSE identifier of the M2M gateway, and record, in the access point information of the AE, the access information allocated by the M2M gateway to the AE; or is configured to: add a piece of access point information at a specific location in an access point information list of the AE, and record, in the access point information added at the specific location, the access information allocated by the M2M gateway to the AE. Further, the recording unit 704 is further configured to record, in the access point information of the AE, the access information allocated by the M2M gateway to the AE.

In addition, the recording unit 704 is configured to: add the piece of access point information at the specific location in the access point information list of the AE, and record, in the access point information added at the specific location, the access information allocated by the M2M gateway to the AE.

The obtaining unit 703 is configured to perform step 503 in FIG. 5. A returning unit 707 is configured to perform steps 602, 6032, and 6034 in FIG. 6.

In addition, the recording unit 708 is further configured to delete, based on a CSE identifier in an access point update request message, access point information that is in the access point information list and that includes the CSE identifier in the access point update request message.

The determining unit 705 is configured to determine, based on the AE-ID, that the access point information of the AE that is included in a registration resource of the AE is the CSE identifier of the M2M gateway. Further, the determining unit 705 is configured to perform steps 410 and 6032' in FIG. 4B and FIG. 6.

In addition, the apparatus in FIG. 7 may be configured to: execute any procedure executed by the M2M platform in the foregoing method procedure, store a registration resource of the AE in FIG. 3A and a Base resource in FIG. 3C.

Figure 8:
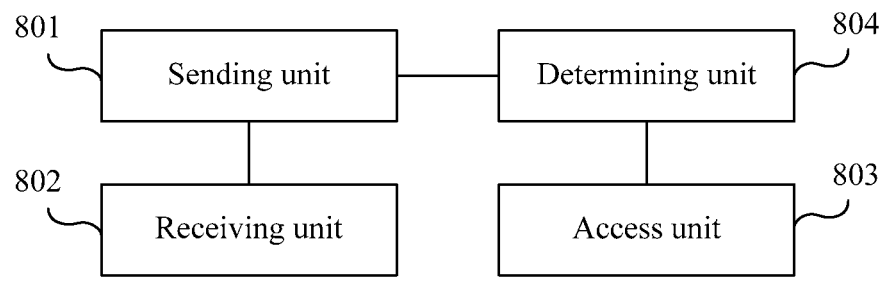
FIG. 8 is a schematic structural diagram of an apparatus of an AE according to an embodiment of the present embodiment.

As shown in FIG. 8, an embodiment of the present embodiment further provides a schematic structural diagram of an apparatus of an AE. The apparatus 800 includes a sending unit 801 and a receiving unit 802.

The sending unit 801 is configured to send an access point switching request message to an M2M platform, where the access point switching request message carries a CSE identifier of an M2M gateway.

The receiving unit 802 is configured to receive an access point switching response message sent by the M2M platform, where the access point switching response message carries access information allocated by the M2M gateway to the AE.

The sending unit 801 is further configured to send a resource access request to the M2M gateway based on the access information allocated by the M2M gateway to the AE.

Further, the sending unit 801 is configured to perform steps 403, 407, 502, 601, 6031, 6033, 6031', and the like in FIG. 4A to FIG. 6. Further, as shown in FIG. 8, the apparatus 800 further includes an access unit 803 and a determining unit 804.

The access unit 803 is configured to access a local area network to which the M2M gateway belongs.

The determining unit 804 is configured to determine a local area network identifier of the local area network.

Further, the access unit 803 is configured to perform step 501 in FIG. 5, and the determining unit 804 is configured to perform step 603 in FIG. 6.

In addition, the apparatus in FIG. 8 may be configured to execute any procedure executed by the AE in the foregoing method procedure.

Figure 9:
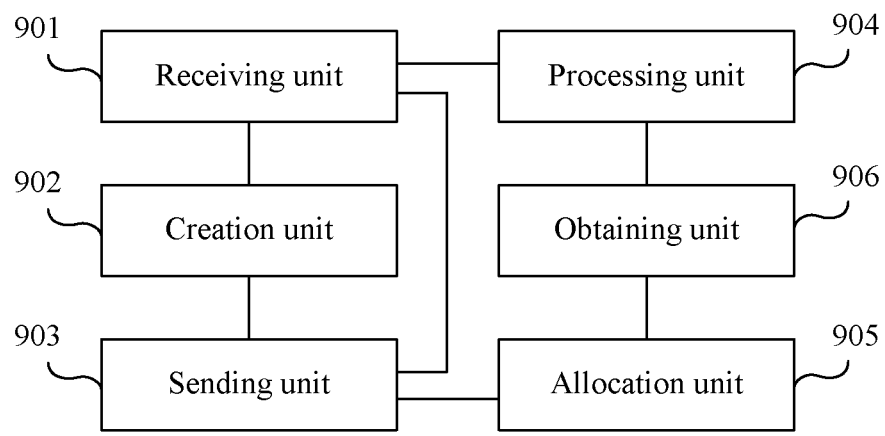
FIG. 9 is a schematic structural diagram of an apparatus of an M2M gateway according to an embodiment of the present embodiment.

As shown in FIG. 9, an embodiment of the present embodiment further provides a schematic structural diagram of an apparatus of an M2M gateway. The apparatus 900 includes a receiving unit 901, a creation unit 902, a sending unit 903, and a processing unit 904.

The receiving unit 901 is configured to receive a resource creation request message sent by an M2M platform, where the resource creation request message is used to request the M2M gateway to create a connection resource of an AE, and the resource creation request message carries an AE-ID.

The creation unit 902 is configured to create the connection resource of the AE based on the resource creation request message, where the connection resource of the AE includes access information of the AE.

The sending unit 903 is configured to send, to the M2M platform, a response message indicating that resource creation succeeds, where the response message indicating that resource creation succeeds carries the access information allocated by the M2M gateway to the AE.

The receiving unit 901 is further configured to receive a resource access request message sent by the AE based on the access information allocated by the M2M gateway to the AE.

The processing unit 904 is configured to process the resource access request message.

Further, the sending unit 903 is configured to perform step 405 shown in FIG. 4A. The processing unit 904 is configured to perform step 408 shown in FIG. 4A. Further, as shown in FIG. 9, the apparatus 900 further includes an allocation unit 905 and an obtaining unit 906. The allocation unit 905 is configured to allocate a connection address of the AE in a local area network based on a local area network identifier of the network to which the M2M gateway belongs, or is further configured to allocate a connection address of the AE in a local area network based on a network type of the local area network of the network to which the M2M gateway belongs and location information of the AE. The obtaining unit 906 is configured to obtain the location information of the AE.

Further, the apparatus in FIG. 9 may be configured to: execute any procedure executed by the M2M gateway in the foregoing method procedure, and store a connection resource of the AE in FIG. 3B.

Further, the apparatuses in FIG. 7, FIG. 8, and FIG. 9 are presented in a form of functional units. The "unit" herein may be an application-specific integrated circuit (application-specific integrated circuit, ASIC), a circuit, a processor and a memory that execute one or more software or firmware programs, an integrated logical circuit, and/or another component that can provide the foregoing functions. In a simple embodiment, persons skilled in the art may learn that the apparatuses in FIG. 7, FIG. 8, and FIG. 9 may use a form shown in FIG. 2. Each unit may be implemented by using the processor and the memory in FIG. 2.

An embodiment of the present embodiment further provides a computer storage medium. The computer storage medium is configured to store a computer software instruction used by the M2M platform shown in FIG. 7, the AE shown in FIG. 8, or the M2M gateway shown in FIG. 9, and includes a program designed for performing the foregoing method embodiments. The AE can implement access point switching by executing the stored instruction.

An embodiment of the present embodiment further provides another computer storage medium. The computer storage medium is configured to store a computer software instruction used by the M2M platform, the AE, and the M2M gateway, and includes a program designed for performing the foregoing method embodiments. The AE can implement access point switching by executing the stored instruction. Persons of ordinary skill in the art should understand that all or some of subject matters in this application may be implemented in software with reference to hardware and/or firmware. For example, the subject matters described in this specification may be implemented in software executed by one or more processors. In an example implementation, the subject matters described in this specification may be implemented by using a non-transitory computer readable medium that stores a computer executable instruction. When a computer processor executes the computer executable instruction, the instruction controls the computer to perform steps. An example computer readable medium applicable to the subject matters described in this specification includes a non-transitory computer readable medium, such as a magnetic disk storage device, a chip storage device, a programmable logical device, or an application-specific integrated circuit. In addition, the computer readable medium that implements the subject matters described in this specification may be located on a single device or computing platform, or may be distributed on a plurality of devices or computing platforms.

Finally, it should be noted that, the foregoing embodiments are merely intended for describing the technical solutions of the present embodiment, but not for limiting the present embodiment. Although the present embodiment is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present embodiment.

What is claimed is:

1. An access point switching method, wherein the method is applied to a machine-to-machine (M2M) communication system, the M2M system comprises an M2M platform, an application entity (AE), and an M2M gateway, the M2M platform is an access point for the AE before the AE performs access point switching, the M2M gateway is an access point for the AE after the AE performs access point switching, the M2M platform is an access point for the M2M gateway, and the method comprises:

receiving, by the M2M platform, a request message sent by the AE for querying a common services entity (CSE) identifier that is of the M2M gateway corresponding to a local area network identifier, wherein the request message for querying the CSE identifier that is of the M2M gateway corresponding to the local area network identifier carries the local area network identifier;

obtaining, by the M2M platform based on the local area network identifier, the CSE identifier that is of the M2M gateway corresponding to the local area network identifier;

sending, by the M2M platform to the AE, a success message carrying the CSE identifier of the M2M gateway;

recording, by the M2M platform in access point information comprising the CSE identifier of the M2M gateway, the local area network identifier of a network to which the M2M gateway belongs;

receiving, by the M2M platform, an access point switching request message sent by the AE, wherein the access point switching request message carries the CSE identifier of the M2M gateway;

sending, by the M2M platform, a resource creation request message to the M2M gateway, wherein the resource creation request message requests the M2M gateway to create a connection resource of the AE, and the resource creation request message carries an identifier of the AE;

receiving, by the M2M platform, a response message indicating that resource creation succeeds, wherein the response message is sent by the M2M gateway, wherein the response message indicating that resource creation succeeds carries access information allocated by the M2M gateway to the AE; and sending, by the M2M platform, an access point switching response message to the AE, wherein the access point switching response message carries the access information allocated by the M2M gateway to the AE.

2. The access point switching method according to claim 1, wherein after the step of receiving, by the M2M platform, an access point switching request message sent by the AE, the method further comprises:

replacing, by the M2M platform, information comprised in access point information of the AE with the CSE identifier of the M2M gateway, and recording, in the access point information of the AE, the access information allocated by the M2M gateway to the AE; or adding, by the M2M platform, a piece of access point information at a specific location in an access point information list of the AE, and recording, in the access point information added at the specific location, the access information allocated by the M2M gateway to the AE.

3. The access point switching method according to claim 2, wherein after the sending, by the M2M platform, an access point switching response message to the AE, the method further comprises:

receiving, by the M2M platform, an access point update request message sent by the AE, wherein the access point update request message carries the identifier of the AE; and if the access point update request message carries an IP address and port number information that are of the AE, replacing, by the M2M platform based on the access point update request message, the access point information of the AE with access point information comprising the IP address and the port number information; or if the access point update request message carries a CSE identifier recorded in the access point information list and information instructing to delete the CSE identifier recorded at a specific location, deleting, by the M2M platform based on the CSE identifier in the access point update request message, access point information that is in the access point information list and that comprises the CSE identifier in the access point update request message.

4. The access point switching method according to claim 3, after the step of receiving, by the M2M platform, an access point update request message sent by the AE, further comprising:

sending, by the M2M platform, a resource deletion request message to an M2M gateway corresponding to the CSE identifier of the M2M gateway that is in the deleted or replaced access point information, wherein the resource deletion request message carries an identifier of the connection resource of the AE;

receiving, by the M2M platform, a success response message sent by the M2M gateway corresponding to the CSE identifier of the M2M gateway that is in the deleted or replaced access point information, wherein the success response message represents that the connection resource of the AE is deleted; and sending, by the M2M platform, the success response message to the AE.

5. The access point switching method according to claim 1, before the step of receiving, by the M2M platform, an access point switching request message sent by the AE, further comprising:

receiving, by the M2M platform, an obtaining request sent by the AE for an M2M gateway adjacent to the AE, wherein the obtaining request for the M2M gateway adjacent to the AE carries location information of the AE and information of an area covered by a local area network corresponding to a local area network type supported by the AE;

returning, by the M2M platform to the AE based on the location information of the AE and the information of the area covered by the local area network corresponding to the local area network type supported by the AE, a CSE identifier of the M2M gateway adjacent to the AE;

receiving, by the M2M platform, a request sent by the AE for querying a CSE identifier of an M2M gateway that belongs to a local area network whose type is the same as the local area network type supported by the AE, wherein the request for querying the CSE identifier of the M2M gateway that belongs to the local area network whose type is the same as the local area network type supported by the AE carries the CSE identifier of the M2M gateway adjacent to the AE and the local area network type supported by the AE;

returning, by the M2M platform, the CSE identifier of the M2M gateway that is adjacent to the AE and that belongs to the local area network whose type is the same as the local area network type supported by the AE; and recording, by the M2M platform in access point information comprising the CSE identifier of the M2M gateway, the type of the local area network to which the M2M gateway belongs.

6. The access point switching method according to claim 1, wherein the method further comprises:

receiving, by the M2M platform, a notification message sent by another device to the AE, wherein the notification message carries the identifier of the AE;

determining, by the M2M platform based on the identifier of the AE, that access point information of the AE that is comprised in a registration resource of the AE is the CSE identifier of the M2M gateway; and forwarding, by the M2M platform, the notification message to the M2M gateway.

7. An access point switching method, wherein the method is applied to a machine-to-machine communication (M2M) system, the M2M system comprises an M2M platform, an application entity (AE), and an M2M gateway, the M2M platform is an access point for the AE before the AE performs access point change, the M2M gateway is an access point for the AE after the AE performs access point change, the M2M platform is an access point for the M2M gateway, and the method comprises:

accessing, by the AE, a local area network to which the M2M gateway belongs, and determining a local area network identifier of the local area network;

sending, by the AE to the M2M platform, a request message for querying a common services entity (CSE) identifier that is of the M2M gateway corresponding to the local area network identifier, wherein the request message for querying the CSE identifier that is of the M2M gateway corresponding to the local area network identifier carries the local area network identifier;

receiving, by the AE, a success message that is sent by the M2M platform and that carries the CSE identifier of the M2M gateway;

sending, by the AE, an access point switching request message to the M2M platform, wherein the access point switching request message carries the CSE identifier of the M2M gateway;

receiving, by the AE, an access point switching response message sent by the M2M platform, wherein the access point switching response message carries access information allocated by the M2M gateway to the AE; and sending, by the AE, a resource access request to the M2M gateway based on the access information allocated by the M2M gateway to the AE.

8. The access point switching method according to claim 7, before the step of sending, by the AE, an access point switching request message to the M2M platform, further comprising:

sending, by the AE to the M2M platform, an obtaining request for an M2M gateway adjacent to the AE, wherein the obtaining request for the M2M gateway adjacent to the AE carries location information of the AE and information of an area covered by a local area network corresponding to a local area network type supported by the AE;

receiving, by the AE, a CSE identifier of the M2M gateway adjacent to the AE that is returned by the M2M platform;

sending, by the AE to the M2M platform, a request for querying a CSE identifier of an M2M gateway that belongs to a local area network whose type is the same as the local area network type supported by the AE, wherein the request for querying the CSE identifier of the M2M gateway that belongs to the local area network whose type is the same as the local area network type supported by the AE carries the CSE identifier of the M2M gateway adjacent to the AE and the local area network type supported by the AE; and receiving, by the AE, the CSE identifier, returned by the M2M platform, of the M2M gateway that is adjacent to the AE and that belongs to the local area network whose type is the same as the local area network type supported by the AE.

9. A machine-to-machine communication (M2M) platform, wherein the M2M platform is an access point for an AE before the AE performs access point switching, the M2M platform is used as an access point for an M2M gateway, the M2M gateway is an access point for the AE after the AE performs access point switching, and the M2M platform comprises:

a memory, configured to store computer executable program code;

a transceiver; and at least one processor, coupled to the memory and the transceiver, wherein the program code comprises at least one instruction, and when the at least one processor executes the at least one instruction, the at least one instruction enables the M2M platform to perform:

receive a request message sent by the AE for querying a common services entity (CSE) identifier that is of the M2M gateway corresponding to a local area network identifier, wherein the request message for querying the CSE identifier that is of the M2M gateway corresponding to the local area network identifier carries the local area network identifier;

obtain based on the local area network identifier, the CSE identifier that is of the M2M gateway corresponding to the local area network identifier;

send to the AE, a success message carrying the CSE identifier of the M2M gateway;

record in access point information comprising the CSE identifier of the M2M gateway, the local area network identifier of a network to which the M2M gateway belongs;

receive an access point switching request message sent by the AE, wherein the access point switching request message carries the CSE identifier of the M2M gateway;

send a resource creation request message to the M2M gateway, wherein the resource creation request message is used to request the M2M gateway to create a connection resource of the AE, and the resource creation request message carries an identifier of the AE;

receive a response message indicating that resource creation succeeds that is sent by the M2M gateway, wherein the response message indicating that resource creation succeeds carries access information allocated by the M2M gateway to the AE; and send an access point switching response message to the AE, wherein the access point switching response message carries the access information allocated by the M2M gateway to the AE.

10. The M2M platform according to claim 9, wherein after receive the access point switching request message sent by the AE, the at least one instruction enables the M2M platform to perform:

replace information comprised in access point information of the AE with the CSE identifier of the M2M gateway, and record in the access point information of the AE, the access information allocated by the M2M gateway to the AE; or add a piece of access point information at a specific location in an access point information list of the AE, and record in the access point information added at the specific location, the access information allocated by the M2M gateway to the AE.

11. The M2M platform according to claim 10, wherein after send an access point switching response message to the AE, the at least one instruction enables the M2M platform to perform:

receive an access point update request message sent by the AE, wherein the access point update request message carries the identifier of the AE; and the access point update request message carries an IP address and port number information that are of the AE, replace based on the access point update request message, the access point information of the AE with access point information comprising the IP address and the port number information; or the access point update request message carries a CSE identifier recorded in the access point information list and information instructing to delete the CSE identifier recorded at a specific location, delete based on the CSE identifier in the access point update request message, access point information that is in the access point information list and that comprises the CSE identifier in the access point update request message.

12. The M2M platform according to claim 11, wherein after receive an access point update request message sent by the AE, the at least one instruction enables the M2M platform to perform:

send a resource deletion request message to an M2M gateway corresponding to the CSE identifier of the M2M gateway that is in the deleted or replaced access point information, wherein the resource deletion request message carries an identifier of the connection resource of the AE;

receive a success response message sent by the M2M gateway corresponding to the CSE identifier of the M2M gateway that is in the deleted or replaced access point information, wherein the success response message is used to represent that the connection resource of the AE is deleted; and send the success response message to the AE.

13. The M2M platform according to claim 9, wherein before receive the access point switching request message sent by the AE, the at least one instruction enables the M2M platform to perform:

receive an obtaining request sent by the AE for an M2M gateway adjacent to the AE, wherein the obtaining request for the M2M gateway adjacent to the AE carries location information of the AE and information about an area covered by a local area network corresponding to a local area network type supported by the AE;

return to the AE based on the location information of the AE and the information about the area covered by the local area network corresponding to the local area network type supported by the AE, a CSE identifier of the M2M gateway adjacent to the AE;

receive a request sent by the AE for querying a CSE identifier of an M2M gateway that belongs to a local area network whose type is the same as the local area network type supported by the AE, wherein the request for querying the CSE identifier of the M2M gateway that belongs to the local area network whose type is the same as the local area network type supported by the AE carries the CSE identifier of the M2M gateway adjacent to the AE and the local area network type supported by the AE;

return the CSE identifier of the M2M gateway that is in adjacent to the AE and that belongs to the local area network whose type is the same as the local area network type supported by the AE; and record in the access point information comprising the CSE identifier of the M2M gateway, the type of the local area network to which the M2M gateway belongs.

14. The M2M platform according to claim 9, wherein the at least one instruction enables the M2M platform to perform:

receive a notification message sent by another device to the AE, wherein the notification message carries the identifier of the AE;

determine based on the identifier of the AE, that the access point information of the AE that is comprised in a registration resource of the AE is the CSE identifier of the M2M gateway; and forward the notification message to the M2M gateway.

15. The M2M device according to claim 14, wherein before send the access point switching request message to the M2M platform, the at least one instruction enables the M2M platform to perform:

send an obtaining request for an M2M gateway adjacent to the AE, wherein the obtaining request for the M2M gateway adjacent to the AE carries location information of the AE and information about an area covered by a local area network corresponding to a local area network type supported by the AE;

receive a CSE identifier of the M2M gateway adjacent to the AE that is returned by the M2M platform;

send to the M2M platform, a request for querying a CSE identifier of an M2M gateway that belongs to a local area network whose type is the same as the local area network type supported by the AE, wherein the request for querying the CSE identifier of the M2M gateway that belongs to the local area network whose type is the same as the local area network type supported by the AE carries the CSE identifier of the M2M gateway adjacent to the AE and the local area network type supported by the AE; and receive the CSE identifier, returned by the M2M platform, of the M2M gateway that is adjacent to the AE and that belongs to the local area network whose type is the same as the local area network type supported by the AE.

16. A machine-to-machine communication (M2M) device, wherein the M2M device comprises an application entity AE, an access point for the AE before the AE performs access point change is an M2M platform, an access point for the AE after the AE performs access point change is an M2M gateway, the M2M platform is further used as an access point for the M2M gateway, and the M2M device comprises:

a memory, configured to store computer executable program code;

a transceiver; and at least one processor, coupled to the memory and the transceiver, wherein the program code comprises at least one instruction, and when the at least one processor executes the at least one instruction, the at least one instruction enables the M2M device to perform:

access a local area network to which the M2M gateway belongs, and determine a local area network identifier of the local area network;

send to the M2M platform, a request message for querying a common services entity (CSE) identifier that is of the M2M gateway corresponding to the local area network identifier, wherein the request message for querying the CSE identifier that is of the M2M gateway corresponding to the local area network identifier carries the local area network identifier;

receive, a success message that is sent by the M2M platform and that carries the CSE identifier of the M2M gateway;

send an access point switching request message to the M2M platform, wherein the access point switching request message carries the CSE identifier of the M2M gateway;

receive an access point switching response message sent by the M2M platform, wherein the access point switching response message carries access information allocated by the M2M gateway to the AE; and send a resource access request to the M2M gateway based on the access information allocated by the M2M gateway to the AE.

* * * * *